United States Patent
Tatsuda et al.

(10) Patent No.: US 9,459,147 B2
(45) Date of Patent: *Oct. 4, 2016

(54) ELECTRONIC APPARATUS AND CONTROL METHOD OF ELECTRONIC APPARATUS

(71) Applicant: Seiko Epson Corporation, Tokyo (JP)

(72) Inventors: Tetsuo Tatsuda, Ina (JP); Shinichi Arazaki, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/607,342

(22) Filed: Jan. 28, 2015

(65) Prior Publication Data

US 2015/0211927 A1 Jul. 30, 2015

(30) Foreign Application Priority Data

Jan. 29, 2014 (JP) .................. 2014-014088

(51) Int. Cl.
  *G01N 21/25* (2006.01)
  *G01J 3/28* (2006.01)
  (Continued)

(52) U.S. Cl.
  CPC ............ *G01J 3/2823* (2013.01); *G01J 3/26* (2013.01); *G01J 3/28* (2013.01); *G01J 3/32* (2013.01); *G01J 3/51* (2013.01)

(58) Field of Classification Search
  CPC ............. G01J 3/28; G01J 3/02; G01J 3/26; G01J 3/51; G01J 3/2823; G01N 21/255
  USPC .................................. 356/402–425
  See application file for complete search history.

(56) References Cited

U.S. PATENT DOCUMENTS 5,255,087 A 10/1993 Nakamura et al.
6,160,618 A * 12/2000 Garner ............... G01N 21/6456
                                                                  250/458.1
(Continued)

FOREIGN PATENT DOCUMENTS

JP  2000-152254 A   5/2000
JP     3297737 B2   7/2002
(Continued)

OTHER PUBLICATIONS

U.S. Appl. No. 14/580,925, filed Dec. 23, 2014, Danjun Zhao et al.
(Continued)

*Primary Examiner* — Abdullahi Nur
(74) *Attorney, Agent, or Firm* — Harness, Dickey & Pierce, P.L.C.

(57) ABSTRACT

A spectrometry device includes a wavelength variable interference filter; a filter driving unit which sets a wavelength of light which is output from the wavelength variable interference filter, and outputs at least red light and green light among three color light beams of predetermined red light in a red color wavelength range, predetermined green light in a green light wavelength range, and predetermined blue light in a blue light wavelength range in a predetermined order; an imaging element which receives at least red light and green light which are output from the wavelength variable interference filter, and obtains at least a red image and a green image among three color images; and an image generation unit which generates a composite image using the latest color images including at least the obtained red image and green image.

12 Claims, 14 Drawing Sheets

(51) Int. Cl.
*G01J 3/26* (2006.01)
*G01J 3/32* (2006.01)
*G01J 3/51* (2006.01)

(56) References Cited

U.S. PATENT DOCUMENTS

| | | |
|---|---|---|
| 2001/0052977 A1 | 12/2001 | Toyooka |
| 2008/0284902 A1 | 11/2008 | Konno et al. |
| 2009/0027518 A1 | 1/2009 | Kita |
| 2014/0371535 A1 | 12/2014 | Seto |
| 2015/0185074 A1 | 7/2015 | Zhao et al. |
| 2015/0211927 A1 | 7/2015 | Tatsuda et al. |
| 2015/0241279 A1* | 8/2015 | Funamoto ............ G01J 3/2823 356/326 |

FOREIGN PATENT DOCUMENTS

| | | |
|---|---|---|
| JP | 2004-219092 A | 8/2004 |
| JP | 2008-102137 A | 5/2008 |
| JP | 2008-118635 A | 5/2008 |
| JP | 2011-182207 A | 9/2011 |
| JP | 2011-226947 A | 11/2011 |
| JP | 5082648 B2 | 11/2012 |
| JP | 2013-017507 A | 1/2013 |
| JP | 2013-226394 A | 11/2013 |
| WO | WO-2005-071372 A1 | 8/2005 |

OTHER PUBLICATIONS

U.S. Appl. No. 14/923,557, filed Oct. 27, 2015, Danjun Zhao et al.

* cited by examiner

ELECTRONIC APPARATUS AND CONTROL METHOD OF ELECTRONIC APPARATUS

BACKGROUND

1. Technical Field

The present invention relates to an electronic apparatus, and a control method of the electronic apparatus.

2. Related Art

In the related art, an apparatus which obtains a spectroscopic image with respect to light with a predetermined wavelength by causing an imaging element to receive light which has passed through a spectral filter is known (refer to Japanese Patent No. 5082648).

The apparatus which is disclosed in Japanese Patent No. 5082648 is configured so as to obtain spectroscopic images with respect to a plurality of wavelengths, and performs a preview display of a color image which is obtained by compositing the spectroscopic images.

Here, in an electronic apparatus which performs a spectral analyzing process, for example, there is a case in which a relative position of the electronic apparatus and a target is changed with reference to a color image which is displayed in real time (hereinafter, also referred to as real time image) which is generated using a spectroscopic image, and a portion at which the spectral analyzing process is performed is specified.

However, in Japanese Patent No. 5082648, a configuration for obtaining such a real time image is not disclosed. For example, when a color image which is disclosed in Japanese Patent No. 5082648 is displayed as a real time image, spectroscopic images are obtained using a plurality of wavelengths, and a real time image is generated from these images. That is, when one spectroscopic image is set to one frame, one real time image is displayed in each of a plurality of frames. For this reason, a time difference by the above described plurality of frames occurs between displaying of the first real time image and the subsequent real time image. There has been a concern that it may not be possible to update a real time image with respect to a change in imaging position, when a relative position of the electronic apparatus and the target is changed during that time.

SUMMARY

An advantage of some aspects of the invention is to provide an electronic apparatus which can improve a frame rate of a real time image, and a control method of the electronic apparatus.

According to an aspect of the invention, there is provided an electronic apparatus which includes a spectral filter which selectively outputs light with a predetermined wavelength from input light, and is capable of changing a wavelength of the output light; a filter driving unit which sets a wavelength of the light which is output from the spectral filter, and sequentially outputs at least red light and green light among three color light beams of predetermined red light in a red color wavelength range, predetermined green light in a green color wavelength range, and predetermined blue light in a blue color wavelength range in a predetermined order from the spectral filter; an imaging element which receives at least the red light and the green light which are sequentially output from the spectral filter, and obtains at least a red image and a green image among three color images of the red image, the green image, and a blue image corresponding to the three color light beams; and an image generation unit which generates a composite image using the latest color images including at least the red image and the green image which are obtained using the imaging element.

Here, generating a composite image using the latest color images means that a composite image is generated from at least a red image and a green image which have been quite recently obtained among a red image, a green image, and a blue image corresponding to three color light beams.

The electronic apparatus according to the aspect of the invention outputs any one of two or more color light beams including red light and green light among three color light beams from a spectral filter, causes an imaging element to receive the light, and obtains a color image corresponding to the received color light. That is, the electronic apparatus obtains a red image with respect to red light, and obtains a green image with respect to green light. In addition, when blue light is also received, the electronic apparatus also obtains a blue image. In addition, when only two color light beams of red light and green light are received, it is possible to generate a blue image from the red image and the green image. A composition image is generated using these three color images.

In this manner, when generating a composite image, at least color images of a red image, a green image, and a blue image of three colors of R (red), G (green), and B (blue) are obtained, that is, color images of three frames are obtained, and it is possible to generate one composite image by compositing these three color images.

In addition, when receiving two color light beams of red light and green light, blue light is generated from a red image and a green image. In this case, it is possible to obtain color images of three colors from color images of two frames of the red image and the green image.

Accordingly, when the above described composite image is set to a real time image, it is possible to generate one real time image at least in each of two frames, when each color light of R, G, and B is sequentially output from a spectral filter, and color light of R and G is alternately output in each of three frames. In this case, it is possible to improve a frame rate of a real time image compared to a case in which all of each of spectroscopic images corresponding to light with a wavelength at an interval of 10 nm, for example, in a visible light range are obtained, and then these are composited.

Here, it is possible to take a configuration into consideration in which a frame rate of a real time image is improved by obtaining each of color images of R, G, and B by arranging filters corresponding to each color of R, G, and B in a matrix, and by arranging color filters which are arranged so that one filter corresponds to each pixel of an imaging element, instead of a spectral filter. However, in such a configuration, sensitivity or resolution deteriorates in respective color images since the number of pixels (that is, light receiving area) corresponding to one color image becomes small.

In the aspect of the invention, though it takes time of at least two frames or three frames, when obtaining a full color image for generating a composite image, it is possible to obtain one color image by receiving light using all pixels of the imaging element, and to improve a frame rate of a real time image while maintaining sensitivity or resolution.

In the electronic apparatus, the filter driving unit may sequentially output the red light and green light from the spectral filter, the imaging element may sequentially obtain the red image and the green image which respectively correspond to the red light and the green light, and the image generation unit may include a blue image generation unit which generates the blue image from the red image and the green image, and a composition unit which composites the latest red image and green image, and the blue image which is generated by the blue image generation unit, and generates the composite image.

Here, among each color light of R, G, and B, a luminance component, that is, a level of contribution with respect to color reproduction color reproduction of the blue light (B) is smallest, and a level of contribution of the green light (G) is largest.

In the aspect of the invention, it is possible to obtain a composite image by obtaining the red image, and the green image with the high level of contribution among the three color images, and by assuming the blue image with the low level of contribution.

With such a configuration, as described above, it is possible to obtain color images of three colors from color images of two frames of a red image and a green image. For this reason, it is possible to generate one real time image in each of at least two frames, and to improve a frame rate of the real time image. In addition, since a full color image is obtained using a time of two frames, it is possible to suppress an occurrence of color shift which is caused when imaging positions are different between each of images.

In the electronic apparatus, the blue image generation unit may generate the blue image from a set of red image and green image every time the set of red image and green image corresponding to a set of the red light and the green light which is consecutively output is obtained, and the composition unit may generate the composite image every time the set of red image and green image is obtained.

In the aspect of the invention, a composite image is generated every time a set of red image and green image is obtained. With such a configuration, a composite image is generated in each of two frames. Accordingly, for example, it is possible to reduce the number of times a composite image is generated, and to suppress a process load which accompanied generation of a composite image, compared to a case in which a composite image is generated every time each color image is obtained.

In the electronic apparatus, the blue image generation unit may generate the blue image from the latest red image and green image every time any of the red image and green image corresponding to the red light and the green light, respectively, is obtained, and the composition unit may generate the composite image every time any of the red image and green image is obtained.

In the aspect of the invention, a red image and a green image are sequentially obtained by outputting two color light beams from the spectral filter, a blue image is generated from the latest red image and green image every time these color images are obtained, and a composite image is generated from these three color images.

With such a configuration, it is possible to update a real time image every time one color image is obtained. In this manner, it is possible to further improve a frame rate of a real time image.

In the electronic apparatus, the filter driving unit may sequentially output the three color light beams in a predetermined order from the spectral filter, the imaging element may sequentially obtain the red image, the green image, and the blue image which correspond to the red light, the green light, and the blue light in a predetermined order, and the image generation unit may generate the composite image in which the latest red image, green image, and blue image are composited every time any of the three color images is obtained.

In the aspect of the invention, a red image, a green image, and a blue image are sequentially obtained by sequentially outputting three color light beams of red light, green light, and blue light from the spectral filter. In addition, a composite image is generated by compositing the latest red image, green image, and blue image every time any of each of color images is obtained.

With such a configuration, it is possible to suppress deterioration in color reproduction since three color images are obtained in order to generate a composite image.

In addition, since it is possible to obtain a full color image in a time of three frames, it is possible to suppress an occurrence of color shift which is caused when there is a difference in imaging position between color images.

In the electronic apparatus, the filter driving unit may output each color light in order of the red light, the green light, the blue light, and the green light.

In the aspect of the invention, color light beams are output from the spectral filter in order of red light, green light, blue light, and green light, and color images corresponding to each color light are sequentially obtained. In addition, a composite image is generated by compositing the latest red image, green image, and blue image every time any one of each of color images is obtained.

With such a configuration, a green image is necessarily obtained between a red image and a blue image. That is, a green image is obtained in one frame of two frames.

Here, a luminance component, that is, a level of contribution with respect to color reproduction of green light (G) is largest among each of color light of R, G, and B. It is possible to update a green image of which a level of contribution with respect to a luminance component is large among color images which are generation sources of a composite image (real time image) which is updated in each frame. For this reason, it is possible to improve a frame rate of a real time image while suppressing deterioration in color reproduction even when three color images are obtained.

In the electronic apparatus, the filter driving unit may set a frequency of outputting the blue light among the color light beams to be lower than frequencies of outputting the red light and the green light.

In the aspect of the invention, a frequency of outputting blue light is lower than frequencies of outputting the red light and green light. That is, each color image is obtained by thinning a blue image of which a level of contribution to color reproduction is small. In this manner, it is possible to relatively increase a ratio of green image of which a level of contribution is large to the whole color image. In this manner, it is possible to improve color reproduction.

In the electronic apparatus, the filter driving unit may output the red light and the green light with intervals of two frames, two frames, and one frame, respectively, therebetween and the blue light at an interval of three frames.

In the aspect of the invention, a color image corresponding to each color is obtained in order of green, red, blue, green, red, green, blue, and green, for example. In addition, every time any of each of color images is obtained, a composite image is generated by compositing the latest red image, green image, and blue image.

With such configuration, as described above, it is possible to relatively increase a proportion of a green image of which a level of contribution is large, by thinning a blue image of which a level of contribution is small, and in this manner, it is possible to improve color reproduction.

In addition, for example, when red light and green light are output at an interval of two frames, or one frame, respectively, and the blue light is output at an interval of three frames from the spectral filter (for example, red, green, blue, red, green, red, green, and blue), there is a case in which four color images are interposed between the blue images, and a time difference of five frames occurs. For this reason, there is a case in which a color shift occurs in which a difference in imaging position between the blue image and other color images occurs.

In contrast to this, in the aspect of the invention, it is possible to reduce a time difference between blue images, and to suppress an occurrence of the color shift by setting the number of color images which are interposed between color images to four.

In the electronic apparatus, the imaging element may perform reading of a charge which is accumulated according to a received light intensity of light which is output from the spectral filter using a non-destructive readout method which is not accompanied by resetting of the accumulated charges, and may include an imaging element driving unit which causes the imaging element to reset the accumulated charge every time a predetermined number of the color images are obtained.

According to the aspect of the invention, the accumulated charge is reset at a predetermined timing. With such a configuration, it is possible to reduce an occurrence of noise which is caused when performing resetting, and to suppress deterioration in a real time image, since the accumulated charge is not reset every time a color image is obtained.

In the electronic apparatus, the imaging element may include the imaging element driving unit which performs reading of the charges which are accumulated according to the received light intensity of the light which is output from the spectral filter using the non-destructive readout method which is not accompanied by resetting of the accumulated charge, and causes the imaging element to reset the accumulated charge when exceeding a predetermined received light intensity.

According to the aspect of the invention, when a predetermined received light intensity is exceeded, the accumulated charge is reset.

Here, the predetermined received light intensity is set so as to be less than a received light intensity which is appropriately detected by the imaging element (that is, saturation exposure amount of imaging element).

With such a configuration, it is possible to prevent color light from being received when exceeding the saturation exposure amount of the imaging element since the accumulated charge is reset when exceeding a predetermined received light intensity.

In addition, since the accumulated charge is not reset every time a color image is obtained, it is possible to reduce noise which occurs when performing resetting, and to suppress deterioration in a real time image.

According to another aspect of the invention, there is provided a control method of an electronic apparatus which includes a spectral filter which selectively outputs light with a predetermined wavelength from input light, and is capable of changing a wavelength of the output light, a filter driving unit which sets a wavelength of light which is output from the spectral filter, an imaging element which receives color light beams output from the spectral filter, and obtain color images, and an image generation unit which generates a composite image using the color images which are obtained using the imaging element, the method including sequentially outputting at least red light and green light among three color light beams of predetermined red light in a red color wavelength range, predetermined green light in a green light wavelength range, and predetermined blue light in a blue light wavelength range from the spectral filter in predetermined order; obtaining at least the red image and green image among three color images of the red image, the green image, and a blue image corresponding to the three color light beams by receiving at least the red light and green light; and generating a composite image using latest color images including at least the red image and green image which are obtained.

In the control method of the electronic apparatus, similarly to the above described invention, any of two or more color light beams including red light and green light among three color light beams are output from the spectral filter, and are received by the imaging element, and a color image corresponding to the received color light is obtained. That is, a red image is obtained with respect to red light, a green image is obtained with respect to green light. In addition, when blue light is also received, a blue image is also obtained. In addition, when only two color light beams of red light and green light are received, it is possible to generate a blue image from the red image and the green image. A composite image is generated using these three color images.

Accordingly, similarly to the above described aspect of the invention, when a composite image is set to a real time image, it is possible to improve a frame rate of the real time image.

In addition, it is possible to obtain one color image by receiving light using all pixels of the imaging element, and to improve a frame rate of a real time image while maintaining sensitivity or resolution.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described based on drawings.

Configuration of Spectrometry Device

Figure 1:
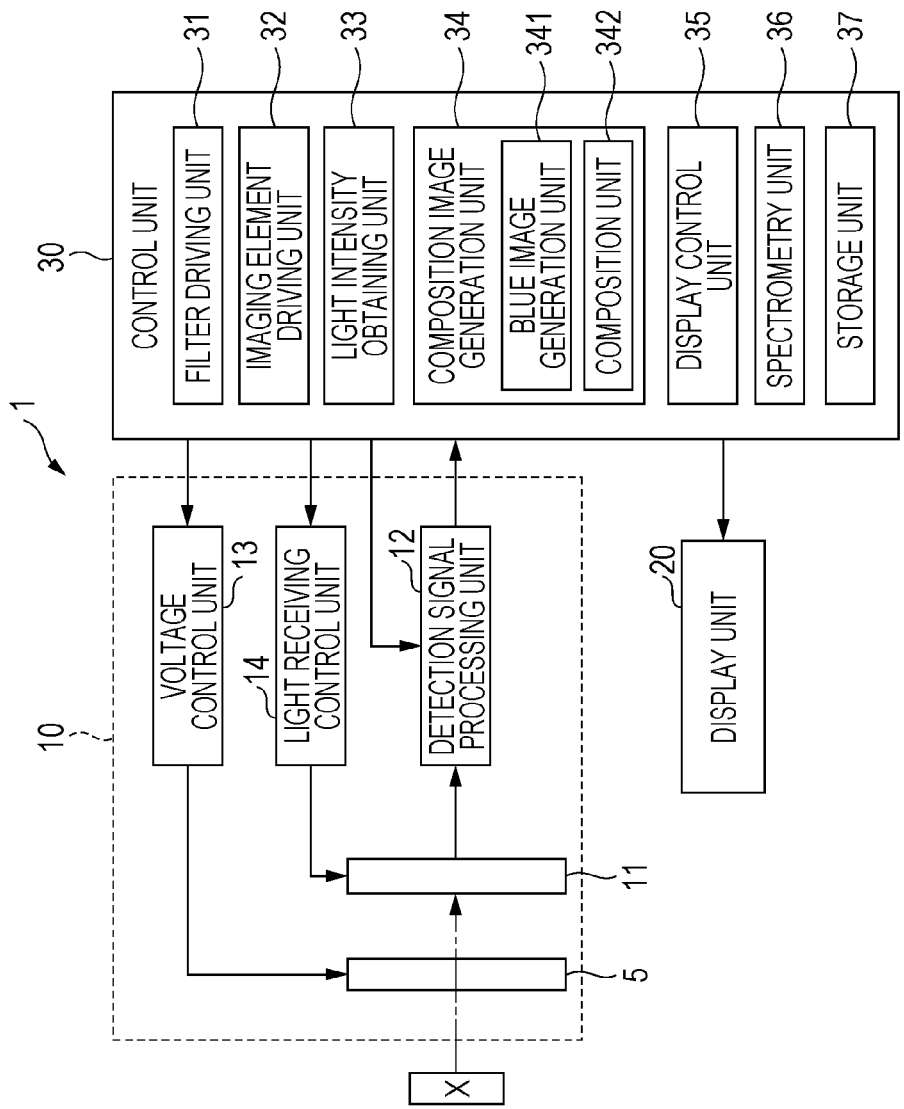
FIG. 1 is a block diagram which illustrates a schematic configuration of a spectrometry device according to a first embodiment of the invention.

FIG. 1 is a block diagram which illustrates a schematic configuration of a spectrometry device in the invention.

A spectrometry device 1 is a device which analyzes a light intensity of each wavelength in measurement target light which is reflected from a measurement target X, and measures an optical spectrum. As illustrated in FIG. 1, the spectrometry device 1 includes an optical module 10, a display unit 20, and a control unit 30 which controls the optical module 10 and the display unit 20, and processes a signal which is output from the optical module 10.

In the spectrometry device 1, a relative position of the spectrometry device 1 and the measurement target X is determined in order to set a measurement position of the measurement target X when performing spectrometry with respect to the measurement target X. At this time, an image which is imaged using the optical module 10 is displayed on the display unit 20 in real time, and the relative position of the spectrometry device 1 and the measurement target X is determined with reference to the image (hereinafter, also referred to as real time image).

In addition, according to the embodiment, an example in which measurement target light which is reflected from the measurement target X is measured is described; however, when a luminous body such as a liquid crystal panel, for example, is used, light which is emitted from the luminous body may be set to a measurement target as the measurement target X.

Configuration of Optical Module

The optical module 10 includes a wavelength variable interference filter 5, an imaging element 11, a detection signal processing unit 12, a voltage control unit 13, and a light reception control unit 14.

The optical module 10 guides measurement target light which is reflected from the measurement target X to the wavelength variable interference filter 5 through an input optical system (not illustrated), and receives the light which has penetrated through the wavelength variable interference filter 5 using the imaging element 11. In addition, a detection signal which is output from the imaging element 11 is output to the control unit 30 through the detection signal processing unit 12.

Configuration of Wavelength Variable Interference Filter

Figure 2:
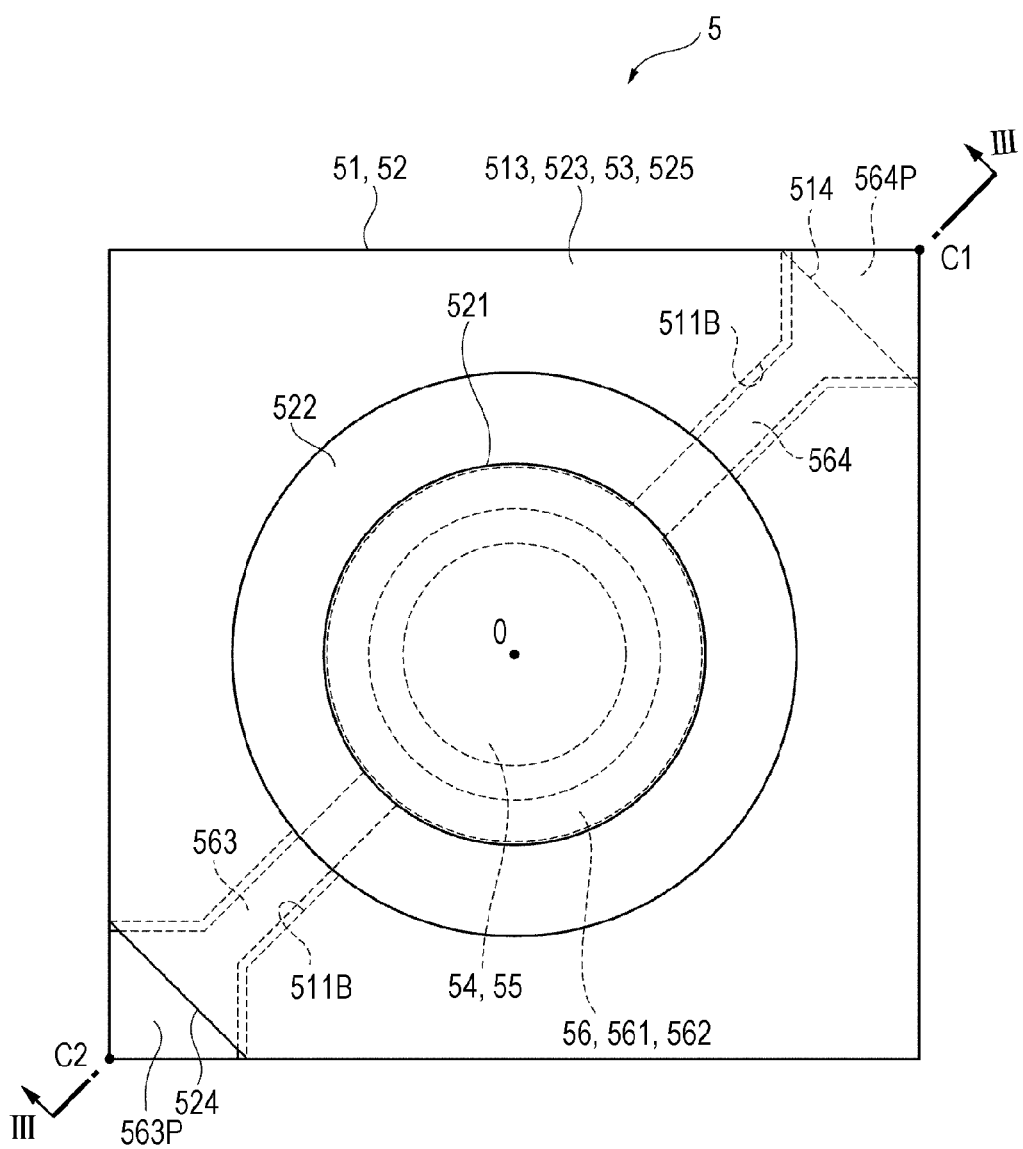
FIG. 2 is a plan view which illustrates a schematic configuration of a wavelength variable interference filter according to the first embodiment.
Figure 3:
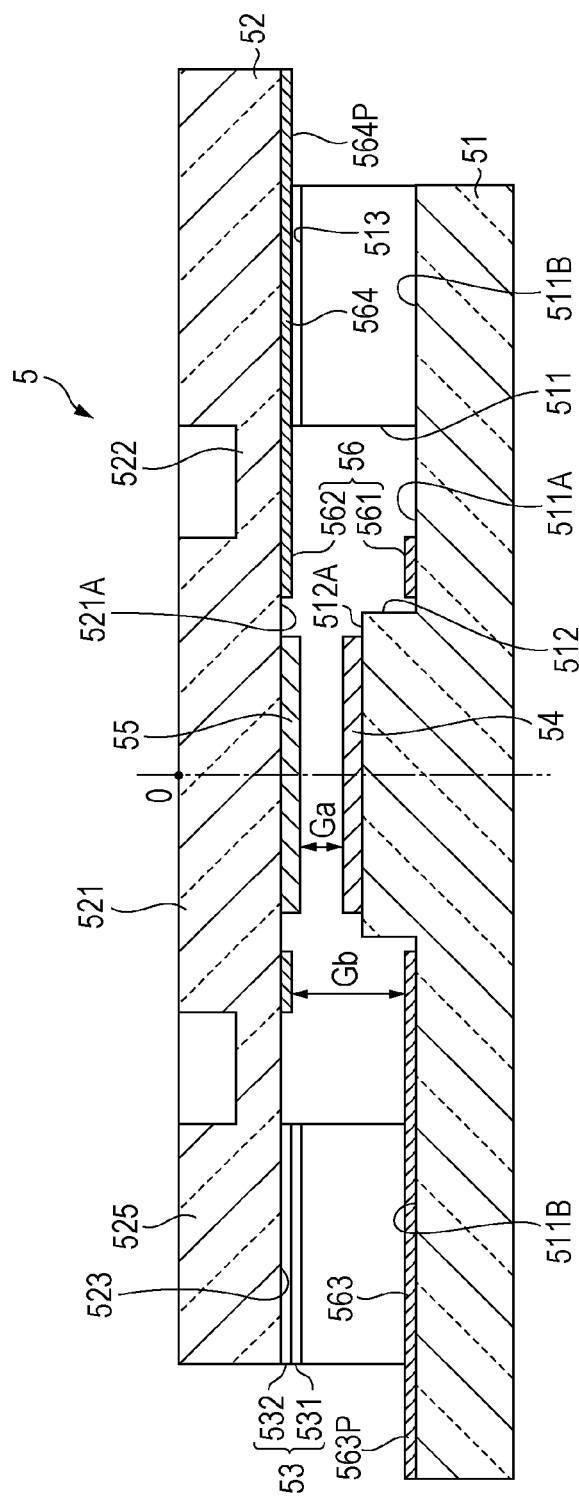
FIG. 3 is a cross-sectional view which illustrates a schematic configuration of the wavelength variable interference filter according to the first embodiment.

FIG. 2 is a plan view which illustrates a schematic configuration of the wavelength variable interference filter. FIG. 3 is a cross-sectional view of the wavelength variable interference filter which is taken along line III-III in FIG. 2.

The wavelength variable interference filter 5 corresponds to a spectral filter in the invention, and a variable wavelength-type Fabry-Perot etalon. The wavelength variable interference filter 5 is a rectangular plate-shaped optical member, for example, and includes a fixed board 51 which is formed with a thickness of approximately 500 nm, for example, and a movable board 52 which is formed with a thickness of approximately 200 nm, for example. This fixed board 51 and movable board 52 are respectively formed using, for example, various types of glass such as soda glass, crystalline glass, quartz glass, fint glass, potassium glass, borosilicate glass, or alkali-free glass, or crystal, or the like. In addition, the fixed board 51 and the movable board 52 are integrally configured when a first bonding unit 513 of the fixed board 51 and a second bonding unit 523 of the movable board are bonded using a bonding film 53 (first bonding film 531 and second bonding film 532) which is configured using a plasma polymerized film, or the like, of which a main component is siloxane, for example.

A fixed reflecting film 54 is provided on the fixed board 51, and a movable reflecting film 55 is provided on the movable board 52. This fixed reflecting film 54 and the movable reflecting film 55 are arranged so as to face each other across a gap Ga. In addition, an electrostatic actuator 56 for adjusting (changing) a size of the gap Ga is provided in the wavelength variable interference filter 5.

In addition, in a planar view (hereinafter, referred to as filter planar view) in FIG. 2 in which the wavelength variable interference filter 5 is viewed in the board thickness direction of the fixed board 51 (movable board 52), planar center points O of the fixed board 51 and movable board 52 match a center point of the fixed reflecting film 54 and the movable reflecting film 55, and match a center point of a movable unit 521 which will be described later.

Configuration of Fixed Board

An electrode arranging groove 511 and a reflecting film arranging unit 512 are formed on the fixed board 51 using etching. A thickness of the fixed board 51 is formed so as to be large with respect to the movable board 52, and there is no bending of the fixed board 51 due to electrostatic attraction or an internal stress of a fixed electrode 561, when a voltage is applied between the fixed electrode 561 and the movable electrode 562.

In addition, a notch portion 514 is formed at an apex C1 of the fixed board 51, and a movable electrode pad 564P which will be described later is exposed to the fixed board 51 side of the wavelength variable interference filter 5.

The electrode arranging groove 511 is formed in a ring shape about the planar center point O of the fixed board 51 in a filter planar view. The reflecting film arranging unit 512 is formed on the movable board 52 side by protruding from a center portion of the electrode arranging groove 511. A groove base of the electrode arranging groove 511 becomes an electrode arranging face 511A on which the fixed electrode 561 is arranged. In addition, a protruding tip end face of the reflecting film arranging unit 512 becomes a reflecting film arranging face 512A.

In addition, an electrode lead groove 511B which extends toward the apex C1 and an apex C2 on the outer edge of the fixed board 51 from the electrode arranging groove 511 is provided on the fixed board 51.

The fixed electrode 561 which configures the electrostatic actuator 56 is provided on the electrode arranging face 511A of the electrode arranging groove 511. More specifically, the fixed electrode 561 is provided in a region facing the movable electrode 562 of the movable unit 521 which will be described later, in the electrode arranging face 511A. In addition, there may be a configuration in which an insulating film for securing insulation between the fixed electrode 561 and the movable electrode 562 is stacked on the fixed electrode 561.

In addition, the fixed extraction electrode 563 which extends in a direction toward the apex C2 from the outer edge of the fixed electrode 561 is provided on the fixed board 51. An extended tip end portion of the fixed extraction electrode 563 (portion at which apex C2 of the fixed board 51 is located) configures a fixed electrode pad 563P which is connected to the voltage control unit 13.

In addition, according to the embodiment, a configuration in which one fixed electrode 561 is provided on the electrode arranging face 511A is illustrated; however, for example, there may be a configuration in which two electrodes which form a concentric circle about the planar center point O are provided (double electrode configuration), or the like.

The reflecting film arranging unit 512 is formed in an approximately columnar shape with a diameter which is smaller than that of the electrode arranging groove 511 on the same axis of the electrode arranging groove 511, and includes the reflecting film arranging face 512A which faces the movable board 52 of the reflecting film arranging unit 512.

As illustrated in FIG. 3, in the reflecting film arranging unit 512, the fixed reflecting film 54 is provided. As the fixed reflecting film 54, it is possible to use, for example, a film of metal such as Ag, or film of an alloy such as an Ag alloy. In addition, a dielectric multilayer film in which a highly refractive layer is set to $TiO_2$, and a low refractive layer is set to $SiO_2$ may be used. In addition, a reflecting film which is formed by stacking a metal film (or alloy film) on a dielectric multilayer film, a reflecting film which is formed by stacking a dielectric multilayer film on a metal film (or alloy film), a reflecting film which is formed by stacking a single refractive layer ($TiO_2$, $SiO_2$, or the like) on a metal layer (or alloy layer), or the like may be used.

In addition, an antireflection film may be formed at a position corresponding to the fixed reflecting film 54, on a light input face (face on which fixed reflecting film 54 is not provided) of the fixed board 51. It is possible to form the antireflection film by alternately stacking a low refractivity index film and a high refractivity index film, and transmissivity is increased by decreasing reflectivity of visible light on the surface of the fixed board 51.

A face on which the electrode arranging groove 511, the reflecting film arranging unit 512, and the electrode lead groove 511B are not formed in the faces of the fixed board 51 which face the movable board 52 using etching configure the first bonding unit 513. A first bonding film 531 is provided on the first bonding unit 513, and when the first bonding film 531 is bonded to the second bonding film 532 which is provided on the movable board 52, the fixed board 51 and the movable board 52 are bonded to each other, as described above.

Configuration of Movable Board

In a plan view of the filter which is illustrated in FIG. 2, the movable board 52 includes a circular movable unit 521 of which a center is the planar center point O, a holding unit 522 which has the same axis as the movable unit 521, and holds the movable unit 521, and a board outer peripheral portion 525 which is provided on the outer side of the holding unit 522.

In addition, as illustrated in FIG. 2, the notch portion 524 is formed on the movable board 52 by corresponding to the apex C2, and the fixed electrode pad 563P is exposed when the wavelength variable interference filter 5 is viewed from the movable board 52 side.

The thickness of the movable unit 521 is formed so as to be larger than that of the holding unit 522. For example, according to the embodiment, the thickness of the movable unit 521 is formed so as to have the same thickness as that of the movable board 52. A diameter of the movable unit 521 is formed so as to be larger than at least that of the outer peripheral edge of the reflecting film arranging face 512A. In addition, the movable electrode 562 and the movable reflecting film 55 are provided in the movable unit 521.

In addition, similarly to the fixed board 51, an antireflection film may be formed on a face on the opposite side to the fixed board 51 of the movable unit 521. Such an antireflection film is formed by alternately stacking a low refractivity index film and a high refractivity index film, and it is possible to increase transmissivity by decreasing reflectivity of visible light on the surface of the movable board 52.

The movable electrode 562 faces the fixed electrode 561 across a gap Gb, and is formed in a ring shape which is the same shape as that of the fixed electrode 561. The movable electrode 562 configures the electrostatic actuator 56 along with the fixed electrode 561. In addition, the movable board 52 includes a movable lead electrode 564 which extends toward the apex C1 of the movable board 52 from the outer peripheral edge of the movable electrode 562. An extending tip end portion of the movable lead electrode 564 (portion located at apex C1 of movable board 52) configures the movable electrode pad 564P which is connected to the voltage control unit 13.

The movable reflecting film 55 is provided so as to face the fixed reflecting film 54 across the gap Ga at a center portion of the movable face 521A of the movable unit 521. As the movable reflecting film 55, a reflecting film which has the same configuration as that of the fixed reflecting film 54, which is described above, is used.

In addition, according to the embodiment, as described above, an example in which a size of the gap Gb is larger than that of the gap Ga is described; however, there is no limitation to this. There may be a configuration in which the size of the gap Ga is larger than that of the gap Gb depending on a wavelength range of the measurement target light, for example, when infrared ray or far-infrared ray is used as the measurement target light, or the like.

The holding unit 522 is a diaphragm which surrounds the periphery of the movable unit 521, and is formed so as to have a smaller width than that of the movable unit 521. The holding unit 522 is easily bent compared to the movable unit 521, and causes the movable unit 521 to be displaced to the fixed board 51 side using slight electrostatic attraction. At this time, since the thickness of the movable unit 521 is larger than that of the holding unit 522, and rigidity of the movable unit increases, even when the holding unit 522 is pulled toward the fixed board 51 side due to the electrostatic attraction, a shape of the movable unit 521 does not change. Accordingly, bending of the movable reflecting film 55 which is provided in the movable unit 521 does not occur, and, it is usually possible to maintain the fixed reflecting film 54 and the movable reflecting film 55 in a state of being parallel to each other.

In addition, according to the embodiment, the diaphragm-shaped holding unit 522 is exemplified; however, there is no particular limitation to this, and, for example, there may be a configuration in which beam-shaped holding units which are arranged at equal angular intervals are provided about the planar center point O, or the like.

As described above, the board outer peripheral portion 525 is provided on the outer side of the holding unit 522 in the filter planar view. A face of the board outer peripheral portion 525 facing the fixed board 51 includes the second bonding unit 523 which faces the first bonding unit 513. In addition, the second bonding film 532 is provided in the second bonding unit 523, and as described above, the fixed board 51 and the movable board 52 are bonded when the second bonding film 532 is bonded to the first bonding film 531.

Configurations of Detection Signal Processing Unit, Voltage Control Unit, and Light Reception Control Unit Subsequently, the optical module 10 will be described by returning to FIG. 1.

The imaging element 11 receives (detects) light which has penetrated through the wavelength variable interference filter 5, and outputs a detection signal based on a received light intensity to the detection signal processing unit 12.

Here, the imaging element 11 stores charges corresponding to the received light intensity in each pixel, respectively. In addition, the imaging element 11 outputs accumulated charges of each pixel corresponding to the received light intensity as detection signals (voltages) while maintaining the accumulated charges. That is, the imaging element 11 is a non-destructive readout element which is configured so as to read the detection signal corresponding to the received light intensity without accompanying resetting of the accumulated charge.

The detection signal processing unit 12 amplifies the input detection signal (analog signal), and outputs the signal to the control unit 30 thereafter, by converting the signal into a digital signal. The detection signal processing unit 12 is configured of an amplifier which amplifies the detection signal, an A/D converter which converts an analog signal into a digital signal, or the like.

The voltage control unit 13 applies a driving voltage to the electrostatic actuator 56 of the wavelength variable interference filter 5 based on control of the control unit 30. In this manner, electrostatic attraction occurs between the fixed electrode 561 and the movable electrode 562 of the electrostatic actuator 56, and the movable unit 521 is displaced to the fixed board 51 side.

The light reception control unit 14 controls the imaging element 11 based on a command signal of the control unit 30. Specifically, the light reception control unit 14 causes the imaging element 11 to start detection of light to be measured. In addition, the light reception control unit 14 performs a readout control which causes the imaging element 11 to output a detection signal. In addition, the light reception control unit 14 performs a reset control in which charges which are accumulated in each pixel of the imaging element 11 are eliminated.

Configuration of Control Unit

Subsequently, the control unit 30 of the spectrometry device 1 will be described.

The control unit 30 is configured by combining a CPU, a memory, and the like, for example, and controls the entire operation of the spectrometry device 1. As illustrated in FIG. 1, the control unit 30 includes a filter driving unit 31, an imaging element driving unit 32, a light intensity obtaining unit 33, a composite image generation unit 34, a display control unit 35, a spectrometry unit 36, and a storage unit 37.

In addition, the storage unit 37 stores various programs, or various data for controlling the spectrometry device 1. The data is, for example, V-λ, data which denotes a wavelength of transmitted light with respect to a driving voltage which is applied to the electrostatic actuator 56, or information related to a measurement wavelength when measuring the measurement target X (measurement start wavelength, changing interval of wavelength, measurement ending wavelength, or the like).

The filter driving unit 31 sets a target wavelength of light which is taken out using the wavelength variable interference filter 5, and outputs a command signal for applying a driving voltage corresponding to the set target wavelength to the electrostatic actuator 56 to the voltage control unit 13 based on the V-λ, data.

The imaging element driving unit 32 outputs a command signal for instructing the light reception control unit 14 a detection start timing of measurement light using the imaging element 11. In addition, the imaging element driving unit 32 outputs a command signal for causing the imaging element 11 to output a detection signal at a timing at which a preset receiving time has passed to the light reception control unit 14. In addition, the imaging element driving unit 32 outputs a command signal for eliminating charges which are accumulated in each pixel of the imaging element 11 to the light reception control unit 14 at a predetermined timing.

The light intensity obtaining unit 33 obtains a detection signal from the imaging element 11 through the detection signal processing unit 12, and obtains a spectroscopic image by obtaining a received light intensity of transmitted light of the wavelength variable interference filter 5 in each pixel of the imaging element 11. The spectroscopic image in which a pixel position and the received light intensity correspond to each other is correlated with a measurement wavelength at the time of detecting, and is stored in the storage unit 37.

The composite image generation unit 34 corresponds to an image generation unit in the invention, and includes a blue image generation unit 341 and a composition unit 342, and generates a composite image by compositing each color image corresponding to each color light of R, G, and B.

The blue image generation unit 341 estimates a blue image corresponding to predetermined blue light in a B wavelength range among light beams from the same measurement target X using operation, using a red image and a green image which respectively correspond to predetermined red light in a R wavelength range and predetermined green light in a G wavelength range among light beams from the measurement target X, and are obtained using the light intensity obtaining unit 33, and obtains the blue image.

The composition unit 342 generates a composite image by compositing the above described red image and green image, and the blue image which is obtained from the red image and the green image.

The display control unit 35 causes the display unit 20 to display a real time image which is generated by the composite image generation unit 34. In addition, the display control unit causes the display unit 20 to display various images such as a spectrometry result, in addition to that.

The spectrometry unit 36 measures a spectral property of measurement target light based on light intensity which is obtained using the light intensity obtaining unit 33.

Spectrometry Process

Subsequently, a spectrometry process using the above described spectrometry device 1 will be described based on drawings.

In the spectrometry device 1, in order to set a measurement position of the measurement target X when performing spectrometry with respect to the measurement target X, an image which is imaged using the optical module 10 is displayed on the display unit 20 in real time. A user determines a relative position of the spectrometry device 1 and the measurement target X with reference to the real time image which is displayed on the display unit 20.

Figure 4:
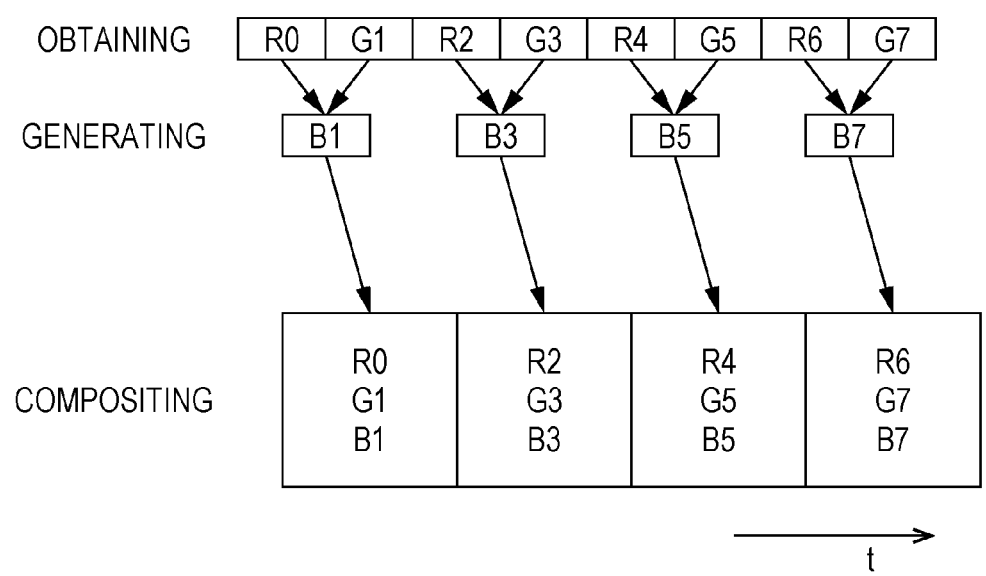
FIG. 4 is a diagram which schematically illustrates an example of a generating procedure of a composite image according to the first embodiment.

Here, FIG. 4 is a diagram which schematically illustrates a procedure of generating a composite image which is displayed as a real time image.

As illustrated in FIG. 4, according to the embodiment, a red image R and a green image G which correspond to two color light beams of R and G are alternately obtained, a set of the red image R and the green image G which are consecutive in the spectrometry device are obtained, and then a blue image B is obtained from these. In addition, a composite image is generated by compositing the red image R, the green image G, and the blue image B. The composite image, that is, a real time image is displayed on the display unit 20. In the spectrometry device 1, the above described process is repeated, and the real time image is updated.

Figure 5:
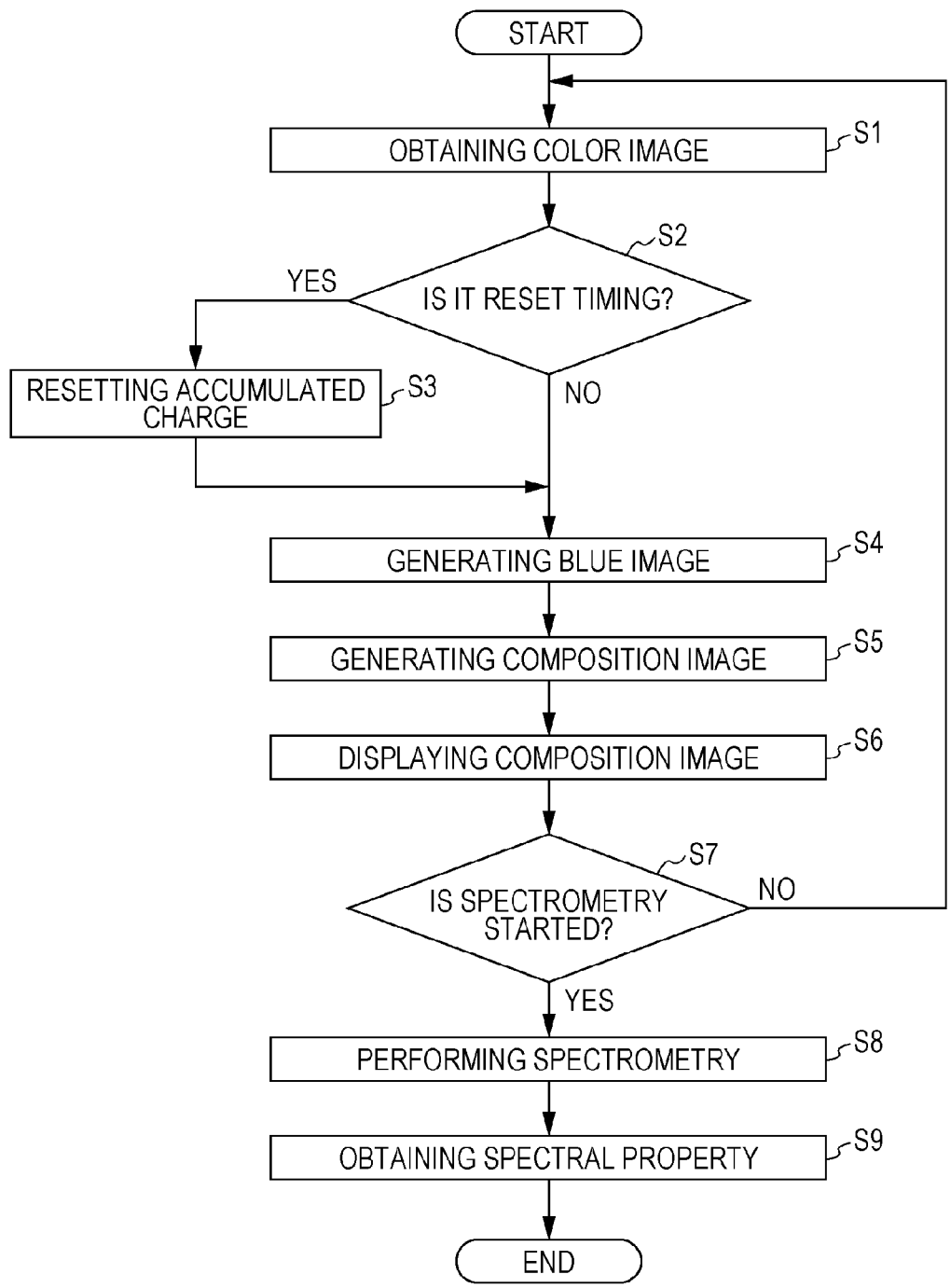
FIG. 5 is a flowchart which illustrates an example of a spectrometry process according to the first embodiment.

FIG. 5 is a flowchart which illustrates an example of the spectrometry process using the spectrometry device 1.

As illustrated in FIG. 5, when receiving the instruction for starting measurement, the spectrometry device 1 obtains color images of each color of R and G, in order to display a real time image (step S1).

In the spectrometry device 1, respective wavelengths of red light and green light are preset in two wavelength ranges of R and G among each color of R (for example, 610 nm to 760 nm), G (for example, 500 nm to 560 nm), and B (for example, 435 nm to 480 nm), and are stored in the storage unit 37.

The filter driving unit 31 controls the voltage control unit 13, and applies a driving voltage corresponding to the target wavelength to the electrostatic actuator 56. In this manner, color light corresponding to the target wavelength penetrates the wavelength variable interference filter 5, is imaged using the imaging element 11, and thereby a color image corresponding to the target wavelength is obtained. When the filter driving unit 31 changes a target wavelength, for example, light which penetrates the wavelength variable interference filter 5 is changed from red light to green light, and a red image and a green image are sequentially obtained.

Subsequently, the imaging element driving unit 32 determines whether or not it is a timing for resetting charges which are accumulated in the imaging element 11 (step S2).

Figure 6:
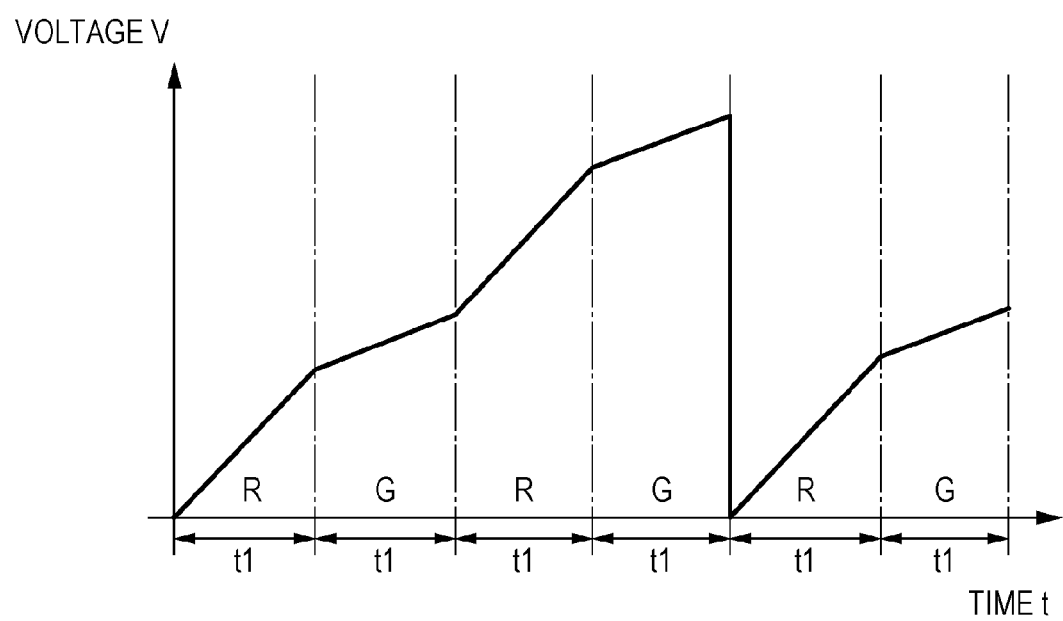
FIG. 6 is a graph which schematically illustrates an example of a voltage change corresponding to an accumulated charge of an imaging element according to the first embodiment.

Here, FIG. 6 is a graph which schematically illustrates a change in time and voltage in one pixel in which charge is accumulated, in the imaging element 11 which is configured so as to store charge in a non-destructive method.

According to the embodiment, a reset timing is set so that charges in the imaging element 11 are reset every time color images of four frames are obtained. That is, when consecutive two color images of R and G are set to a set of color images, it becomes a reset timing every time two sets of color images are obtained (that is, every time t1×4 elapses), and the charges of the imaging element 11 are reset (step S3). When it is not a reset timing, charges in the imaging element 11 are not reset, and are consecutively accumulated.

In addition, there is setting such that whether or not it is a reset timing is determined every time a set of color images is obtained; however, the determination may be made every time each color image is obtained, that is, in each of one frame.

Subsequently, the blue image generation unit 341 generates a blue image from the obtained red image and green image (step S4).

In addition, the composition unit 342 composites the red image and green image which are obtained in step S4, and generates a composite image (step S5).

In addition, the display control unit 35 causes the display unit 20 to display the generated composite image as a real time image (step S6).

Specifically, as illustrated in FIG. 4, the blue image generation unit 341 generates a blue image B1 using a red image R0 and a green image G1, after the red image R0 and the green image G1 are sequentially obtained. In addition, as a method of generating a blue image from a red image and a green image, a method of obtaining a luminance value of a position corresponding to each pixel of a blue image as a mean value of each pixel of the red image and green image may be exemplified. In addition, a method in which a luminance value of a position corresponding to each pixel of a blue image is estimated based on a luminance value of each pixel of a red image and green image may be exemplified.

In addition, the composition unit 342 generates a composite image (R0G1B1) which is a color image by compositing the red image R0, the green image G1, and the blue image B1.

The display control unit 35 causes the display unit 20 to display the composite image (R0G1B1).

Subsequently, the control unit 30 determines whether or not an instruction for starting spectrometry has been received (step S7).

When the instruction for starting spectrometry has not been received (No in step S7), processes in steps S1 to S6 are performed, and a real time image is displayed, consecutively. That is, as illustrated in FIG. 4, a red image R2 and a green image G3 are obtained following the red image R0 and the green image G1. In addition, a blue image B3 is generated from a red image R2 and a green image G3. A composite image (R2G3B3) is generated by compositing the red image R2, the green image G3, and the blue image B3 which are obtained in this manner, and is displayed on the display unit 20.

That is, the spectrometry device 1 sequentially obtains a red image and a green image until receiving an instruction for starting spectrometry (Yes in step S7), generates a composite image every time a set of a red image and a green image for the spectrometry device is obtained, and performs a real time display process of displaying the composite image on the display unit 20.

In addition, according to the embodiment, the imaging element 11 which is configured so as to store charges in a non-destructive manner is used. Accordingly, when sequentially obtaining a color image without resetting accumulated charges, a received light intensity of each pixel is obtained in a period of time after a gap size of the wavelength variable interference filter 5 is stabilized (period of time in which period of time in which gap size of wavelength variable interference filter 5 fluctuates is excluded).

When receiving an instruction for starting spectrometry (Yes in step S7), the spectrometry device 1 performs spectrometry (step S8).

The filter driving unit 31 reads a driving voltage with respect to a measurement wavelength from the V-λ, data which is stored in the storage unit 37, and outputs a command signal for applying the driving voltage to the electrostatic actuator 56 to the voltage control unit 13. In this manner, the driving voltage is applied to the electrostatic actuator 56, and a gap Ga is set to a size corresponding to the measurement wavelength. When the gap Ga is set, light of the measurement wavelength is transmitted from the wavelength variable interference filter 5, and is input to the imaging element 11. The light intensity obtaining unit 33 obtains a light intensity of each pixel at the measurement wavelength based on a detection signal in each pixel of the imaging element 11. The spectrometry device 1 similarly obtains a light intensity related to all the measurement wavelengths. The spectrometry unit 36 obtains a spectrometry result based on the obtained light intensities.

Subsequently, the spectrometry unit 36 obtains a spectral spectrum using selected light receiving data (step S9). The spectrometry unit 36 calculates the spectral spectrum as a measurement target using the light intensity which is calculated with respect to each wavelength.

Operational Effects of First Embodiment

The spectrometry device 1 causes red light and green light among three color light beams to be sequentially output from the wavelength variable interference filter 5, causes the imaging element 11 to receive the light beams, and obtains a color image corresponding to the received color light beams. In addition, a blue image is generated from a red image and a green image every time a set of red image and green image is obtained, and a composite image is generated using these three color images. In this manner, it is possible to obtain three color images from color images of two frames of a red image and a green image.

It is possible to generate one real time image every two frames by setting the composite image which is obtained in this manner to a real time image, and to improve a frame rate of the real time image.

In addition, since it is possible to obtain two color images using a time of two frames, it is possible to suppress an occurrence of a color shift which is caused by an imaging position shift between color images.

In addition, when obtaining each color image of R, G, and B, a luminance component, that is, a level of contribution with respect to color reproduction of the blue image (B) is smallest, and a level of contribution of the green light (G) is largest among each color light of R, G, and B. Accordingly, by obtaining a red image and a green image, and estimating a blue image from these color images, it is possible to improve a frame rate of a real time image while suppressing deterioration in color reproduction.

Here, filters corresponding to each color of R, G, and B are arranged in a matrix, and a configuration is taken into consideration in which a frame rate of a real time image is improved by obtaining each color image of R, G, and B at the same time, by arranging color filters which are arranged so that one filter corresponds to each pixel of the imaging element 11, instead of the wavelength variable interference filter 5. However, with such a configuration, sensitivity or resolution in each color image deteriorates since the number of pixels (light receiving area) corresponding to one color image is reduced.

In contrast to this, though it takes a time of at least two frames in order to obtain a full color image, it is possible to obtain a color image by receiving colored light on the entire face of the imaging element 11, and to improve a frame rate of a real time image while maintaining sensitivity or resolution.

The spectrometry device 1 generates a blue image from an obtained red image and green image by sequentially outputting two color light beams of red light and green light from the wavelength variable interference filter 5. With such a configuration, it is possible to improve a frame rate of a real time image while suppressing deterioration in color reproduction by generating a blue image corresponding to blue light of which a level of contribution to color reproduction is smallest from a red image and a green image.

In addition, according to the embodiment, a composite image is generated every time a set of red image and green image is obtained. For example, it is possible to reduce the number of times a composite image is generated, and to reduce a processing load of the control unit 30 compared to a case in which a composite image is generated every time each color image is generated.

In addition, according to the embodiment, a red image and a green image are sequentially obtained, and a composite image is generated every time a green image is obtained. With such a configuration, it is possible to suppress deterioration in color reproduction compared to a case in which a composite image is generated every time a red image is obtained, since a composite image is generated immediately after obtaining a green image of which a level of contribution to color reproduction is large. Accordingly, it is possible to improve a frame rate of a real time image while suppressing an increase in process load, and deterioration in color reproduction.

In addition, according to the embodiment, accumulated charges of the imaging element 11 which can perform non-destructive reading is reset at a predetermined timing, that is, at a timing in which light receiving is performed by a predetermined frames. With such a configuration, it is possible to reduce noise which occurs when performing resetting, and to suppress deterioration in a real time image, since accumulated charges are not accumulated every time a color image is obtained.

Second Embodiment

Hereinafter, a second embodiment of the invention will be described based on drawings.

According to the first embodiment, a red image and a green image are sequentially obtained, and a composite image is obtained every time a set of red image and green image are consecutively obtained, that is, every two frames; however, according to the embodiment, it is different from the first embodiment that a red image and a green image are sequentially obtained, and a composite image is generated every time a color image is obtained.

Figure 7:
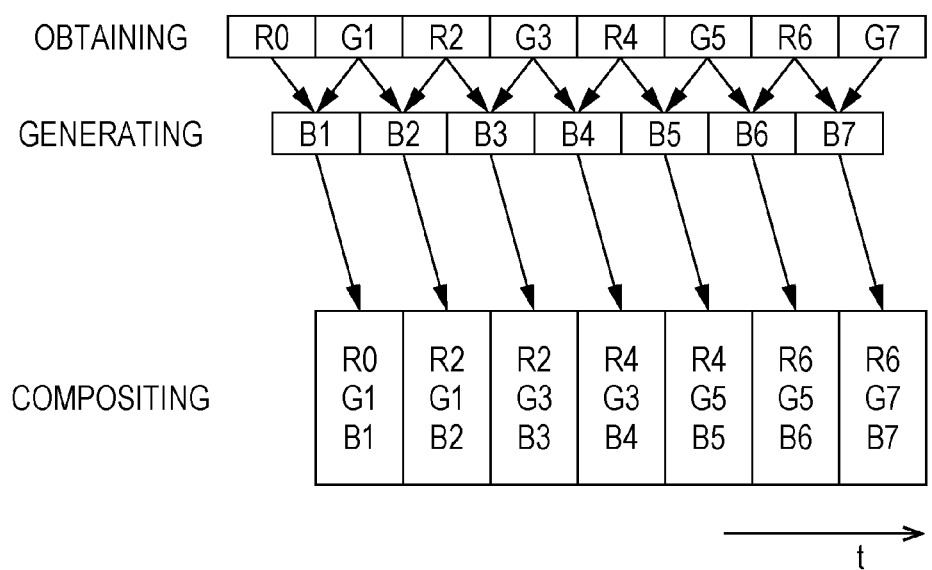
FIG. 7 is a diagram which schematically illustrates an example of a generating procedure of a composite image according to a second embodiment.

FIG. 7 is a diagram which schematically illustrates a procedure of generating a composite image in the second embodiment.

According to the embodiment, as illustrated in FIG. 7, a spectrometry device 1 sequentially obtains a red image and a green image, similarly to the first embodiment. According to the embodiment, the blue image generation unit 341 generates a blue image using the latest red image and green image every time any color image from a red image and a green image is obtained, and the composition unit 342 generates a composite image. The generated composite image is displayed on the display unit 20.

Specifically, as illustrated in FIG. 7, after obtaining a green image G1 which is subsequent to the first red image R0 (step S1 in FIG. 5), the blue image generation unit 341 a blue image B1 using this red image R0 and the green image G1 (step S4 in FIG. 5). In addition, the composition unit 342 generates a composite image (R0G1B1) which is a color image by compositing the red image R0, the green image G1, and the blue image B1 (step S5 in FIG. 5). The display control unit 35 causes the display unit 20 to display the composite image (R0G1B1) (step S6 in FIG. 5). In addition, the blue image is not generated before the first red image R0 is obtained, and the subsequent green image G1 is obtained, and a composite image may not be generated.

Subsequently, after obtaining a red image R2 which is subsequent to the latest green image G1, that is, when the latest red image is updated, the blue image generation unit 341 generates a blue image B2 using this latest red image R2 and green image G1, and updates the latest blue image (step S4 in FIG. 5). In addition, the composition unit 342 generates a composite image (R2G1B2) which is a color image by compositing the latest red image R2, green image G1, and blue image B2 (step S5 in FIG. 5).

Hereinafter, the spectrometry device 1 generates a composite image using the latest three color images every time a red image and a green image are sequentially obtained, until receiving an instruction for starting optical measurement (step S7 in FIG. 5), and causes the display unit 20 to display the composite image.

Operational Effects of Second Embodiment

In the second embodiment, two color light beams are sequentially output from the wavelength variable interference filter 5, a red image and a green image are sequentially obtained, the latest red image, green image, and blue image are generated every time these color images are obtained, and a composite image is generated from these three color images.

With such a configuration, it is possible to update a real time image every time one color image is obtained, that is, in each of one frame. In this manner, it is possible to improve a frame rate of a real time image.

Third Embodiment

Hereinafter, a third embodiment of the invention will be described based on drawings.

According to the first embodiment, a red image and a green image are sequentially obtained, and a composite image is obtained every time a set of red image and green image which are consecutively obtained is obtained, that is, every two frames; however, the embodiment is different from the first embodiment in a point that a red image, a green image, and a blue image are sequentially obtained in a predetermined order, and a composite image is generated every time a color image is obtained.

Figure 8:
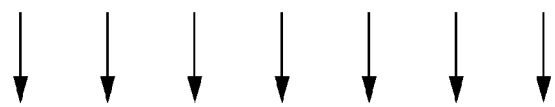
FIG. 8 is a diagram which schematically illustrates an example of a generating procedure of a composite image according to a third embodiment.

FIG. 8 is a diagram which schematically illustrates a procedure of generating a composite image in the third embodiment.

According to the embodiment, as illustrated in FIG. 8, as an example, the spectrometry device 1 sequentially outputs a red image, a green image, and a blue image from the wavelength variable interference filter 5, and sequentially obtains color images in order of a red image (R), a green image (G), and a blue image (B). According to the embodiment, the composition unit 342 generates a composite image using the latest red image, green image, and blue image every time any one of three color images is obtained. The generated composite image is displayed on the display unit 20.

In addition, the spectrometry process according to the third embodiment is approximately the same as that in the first embodiment, except for a point that a process of generating a blue image (step S4 in FIG. 5) is not performed.

Specifically, as illustrated in FIG. 8, the composition unit 342 generates a composite image (R0G1B2) (step S5 in FIG. 5) which is a color image by compositing the red image R0, the green image G1, and a blue image B2 after the red image R0, the green image G1, and a blue image B2 are sequentially obtained (step S1 in FIG. 5). The display control unit 35 causes the display unit 20 to display the composite image (R0G1B2) (step S6 in FIG. 5). In addition, a composite image may not be generated until the first blue image B2 is obtained.

Subsequently, when a red image R3 which is subsequent to the latest blue image B2 is obtained, and the latest red image is updated, the composition unit 342 generates a composite image (R3G1B2) which is a color image by compositing the latest red image R3, green image G1, and blue image B2 (step S5 in FIG. 5).

Hereinafter, every time a red image, a green image, and a blue image are sequentially obtained, the spectrometry device 1 generates a composite image using the latest three color images, and is displayed on the display unit 20, until receiving an instruction for starting optical measurement (step S7 in FIG. 5).

In addition, according to the embodiment, as an example, a case in which three color images are obtained in order of a red image, a green image, and a blue image has been described; however, there is no limitation to the above configuration. For example, there may be a configuration in which each color image is obtained in an arbitrary order which is obtained as a permutation of three color images such as an order of a green image, a blue image, and a red image, or an order of a green image, a red image, and a blue image.

Operational Effects of Third Embodiment

According to the embodiment, a red image, a green image, and a blue image are sequentially obtained in a predetermined order. In addition, a composite image is generated by compositing the latest red image, green image, and blue image every time any of each of color images is obtained.

In such a configuration, it is possible to suppress deterioration in color reproduction since three color images are obtained in order to generate a composite image.

In addition, it is possible to update a real time image every time one color image is obtained. In this manner, it is possible to suppress a shift between each of color images.

In addition, since a red image, a green image, and a blue image are sequentially obtained in a predetermined order, each color image is obtained every three frames, and since a time difference between the latest red image, green image, and blue image can be set as three frames maximum, it is possible to suppress a shift between each of color images.

Fourth Embodiment

Hereinafter, a fourth embodiment of the invention will be described based on drawings.

According to the third embodiment, a red image, a green image, and a blue image are sequentially obtained; however, in the embodiment, a difference from the third embodiment is that a red image and a blue image are alternately obtained such that a green image is interposed therebetween, and a frequency of obtaining a green image is increased.

Figure 9:
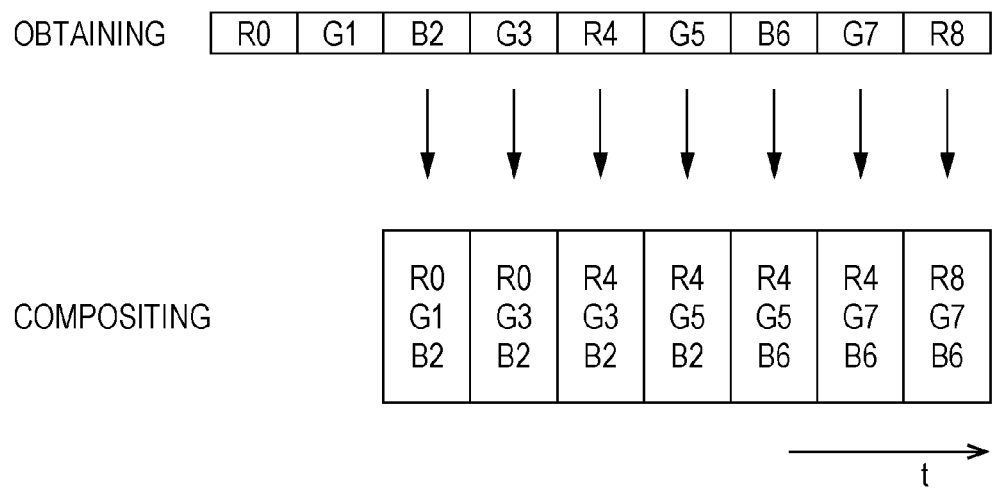
FIG. 9 is a diagram which schematically illustrates an example of a generating procedure of a composite image according to a fourth embodiment.

FIG. 9 is a diagram which schematically illustrates a procedure of generating a composite image in the fourth embodiment.

According to the embodiment, as illustrated in FIG. 9, as an example, the spectrometry device 1 causes a red image, a green image, and a blue image to be sequentially output from the wavelength variable interference filter 5. That is, the spectrometry device 1 sequentially obtains color images in order of a red image (R), a green image (G), a blue image (B), and a green image (G). In addition, the composition unit 342 generates a composite image using the latest red image, green image, and a blue image every time any one of three color images is obtained. The generated composite image is displayed on the display unit 20.

Specifically, as illustrated in FIG. 9, the composition unit 342 generates a composite image (R0G1B2) which is a color image by compositing the red image R0, the green image G1, and the blue image B2 (step S5 in FIG. 5), after the red image R0, the green image G1, and the blue image B2 are sequentially obtained (step S1 in FIG. 5). The display control unit 35 causes the display unit 20 to display the composite image (R0G1B2) (step S6 in FIG. 5).

Subsequently, when a green image G3 is obtained following the latest blue image B2, and the latest green image is updated, the composition unit 342 generates a composite image (R0G3B2) which is a color image by compositing the latest red image R0, green image G3, and blue image B2.

Subsequently, when a red image R4 is obtained following the latest green image G3, and the latest red image is updated, the composition unit 342 generates a composite image (R4G3B2) which is a color image by compositing the latest red image R4, green image G3, and blue image B2.

Hereinafter, the spectrometry device 1 sequentially obtains a red image, a green image, and a blue image in the above described order until receiving an instruction for starting optical measurement (step S7 in FIG. 5), generates a composite image using the latest three color images every time any one of color images is obtained, and causes the display unit 20 to display the composite image.

Operational Effects of Fourth Embodiment

According to the embodiment, color images are sequentially obtained in order of a red image, a green image, a blue image, and a green image. In addition, every time any one of color images is obtained, the latest red image, green image, and a blue image are composited, and a composite image is generated.

In such a configuration, a green image is necessarily obtained between a red image and a green image. That is, among color images which are generation sources of a composite image (real time image), it is possible to update a green image of which a level of contribution to a luminance component is large in every two frames. For this reason, it is possible to suppress deterioration in color reproduction even when three color images are obtained.

Fifth Embodiment

Hereinafter, a fifth embodiment of the invention will be described based on drawings.

In the third embodiment, a red image, a green image, and a blue image are sequentially obtained; however, in contrast to this, the embodiment is different from the third embodiment in a point that the number of times of obtaining a blue image is reduced when sequentially obtaining a red image, a green image, and a blue image.

Figure 10:
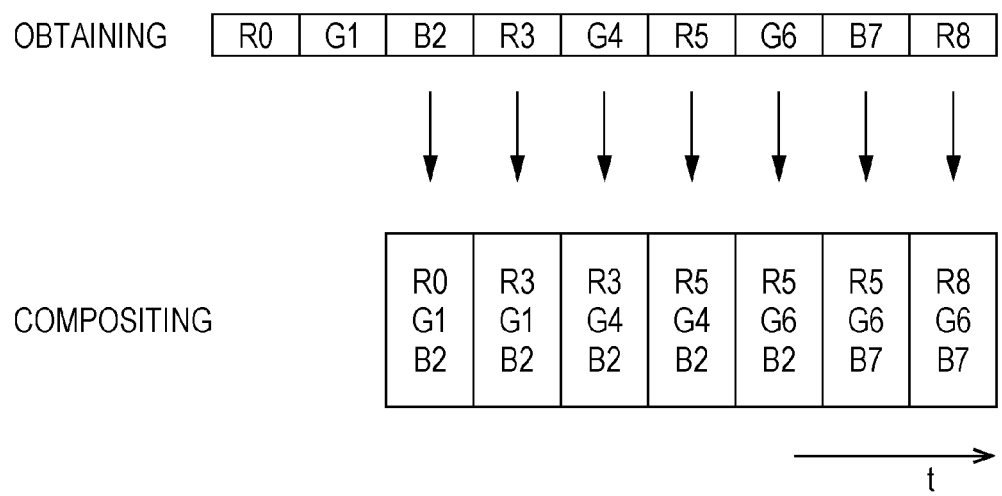
FIG. 10 is a diagram which schematically illustrates an example of a generating procedure of a composite image according to a fifth embodiment.

FIG. 10 is a diagram which schematically illustrates a procedure of generating a composite image in the fifth embodiment.

According to the embodiment, as illustrated in FIG. 10, as an example, the spectrometry device 1 causes red light, green light, blue light, red light, and green light to be sequentially output from the wavelength variable interference filter 5. That is, the spectrometry device 1 sequentially obtains color images in order of a red image (R), a green image (G), and a blue image (B), a red image (R), and a green image (G). In addition, the composition unit 342 generates a composite image using the latest red image, green image, and blue image every time any one of three color images is obtained. The generated composite image is displayed on the display unit 20.

Specifically, as illustrated in an example in FIG. 10, color images are obtained in order of a red image R0, a green image G1, a blue image B2, a red image R3, a green image G4, a red image R5, a green image G6, a blue image B7 and a red image R8. A composite image is generated in order of (R0G1B2), (R3G1B2), (R3G4B2), (R5G4B2), (R5G6B2), (R5G6B7), and (R8G6B7), every time each color image is obtained.

The spectrometry device 1 sequentially obtains color images in order of a red image, a green image, a blue image, a red image, and a green image until receiving an instruction for starting optical measurement (step S7 in FIG. 5), and generates a composite image using the latest three images every time any one of color images is obtained.

In this manner, a red image and a green image are sequentially obtained by four frames while a blue image is obtained, and then the subsequent blue image is obtained, and accordingly, a frequency of obtaining a blue image is reduced.

Operational Effects of Fifth Embodiment

According to the embodiment, a frequency of outputting blue light is lower than frequencies of outputting red light and green light. Specifically, when red light, green light, blue light, red light, and green light are sequentially output from the wavelength variable interference filter 5, blue light is output once among five consecutive color light beams, and for example, color images are sequentially obtained in order of a red image, a green image, a blue image, a red image, and a green image. In addition, a composite image is generated by compositing the latest red image, green image, and blue image every time any one of each of color images is obtained.

In such a configuration, as described above, each color image is obtained by thinning a blue image of which a level of contribution to color reproduction is small. In this manner, it is possible to relatively increase a ratio of a green image of which a level of contribution is large to the entire color image. In this manner, it is possible to improve color reproduction.

Sixth Embodiment

Hereinafter, a sixth embodiment of the invention will be described based on drawings.

In the fifth embodiment, color images are obtained in order of a red image, a green image, a blue image, a red image, and a green image; however, in contrast to this, the embodiment is different from the fifth embodiment in a point that a red image and a green image are obtained with intervals of two frames, two frames, and one frame, respectively, therebetween, and a blue image is obtained at intervals of three frames.

Figure 11:
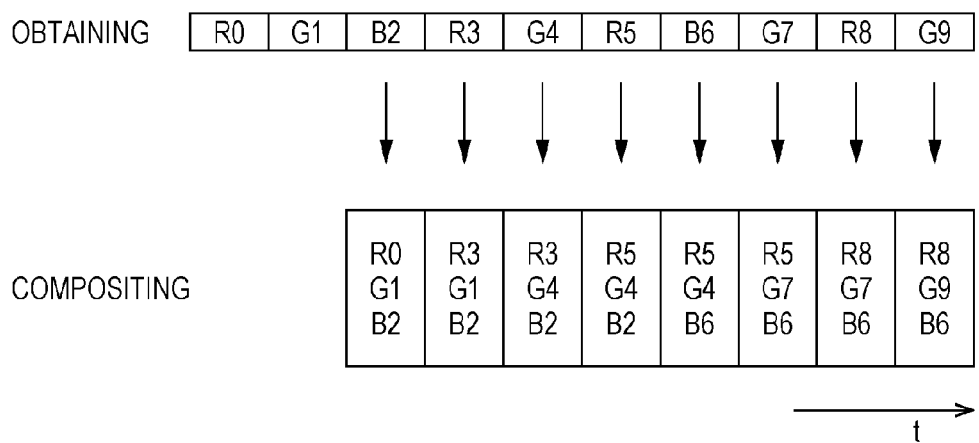
FIG. 11 is a diagram which schematically illustrates an example of a generating procedure of a composite image according to a sixth embodiment.

FIG. 11 is a diagram which schematically illustrates a procedure of generating a composite image in the sixth embodiment.

According to the embodiment, as illustrated in FIG. 11, as an example, the spectrometry device 1 causes red light and green light to be output with intervals of two frames, two frames, and one frame, respectively, therebetween, and causes blue light to be output with an interval of three frames therebetween from the wavelength variable interference filter 5. More specifically, each color light is caused to be sequentially output from the wavelength variable interference filter 5 in order of red light, green light, red light, blue light, green light, red light, green light, and blue light. That is, the spectrometry device 1 sequentially obtains color images in order of a red image (R), a green image (G), a red image (R), a blue image (B), a green image (G), a red image (R), a green image (G), and a blue image (B). In addition, the composition unit 342 generates a composite image using the latest red image, green image, and blue image every time any one of three color images is obtained. The generated composite image is displayed on the display unit 20.

Specifically, as illustrated in FIG. 11, color images are obtained in order of a red image R0, a green image G1, a blue image B2, a red image R3, a green image G4, a red image R5, a blue image B6, a green image G7, a red image R8, and a green image G9 . . . . Every time each of color images is obtained, composite images are generated in order of (R0G1B2), (R3G1B2), (R3G4B2), (R5G4B2), (R5G4B6), (R5G7B6), (R8G7B6) and (R8G9B6).

The spectrometry device 1 sequentially obtains color images in order of a red image, a green image, a blue image, a red image, and a green image until receiving an instruction of starting optical measurement (step S7 in FIG. 5), and a composite image is generated using the latest three color images every time any one of color images is obtained.

In this manner, a red image and a green image are sequentially obtained in four frames after a blue image is obtained, and then the subsequent blue image is obtained, and accordingly, a frequency of obtaining a blue image is reduced.

Operational Effects of Sixth Embodiment

According to the embodiment, color images are sequentially obtained in the order of a red image (R), a green image (G), a red image (R), a blue image (B), a green image (G), a red image (R), a green image (G), and a blue image (B), and a composite image is generated by compositing the latest red image, green image, and blue image every time any one of color images is obtained.

In such a configuration, as described above, it is possible to relatively increase a proportion of a green image of which a level of contribution is large by thinning a blue image of which a level of contribution to color reproduction is small, and in this manner, it is possible to improve color reproduction.

In addition, for example, when red light and green light are output with intervals of two frames and one frame, respectively, therebetween, and blue light is output with an interval of three frames therebetween from the wavelength variable interference filter 5 (for example, red, green, blue, red, green, red, green, and blue), there is a case in which four color images are interposed between blue images, and a time difference of five frames occurs. For this reason, there is a case in which a time difference becomes long, an imaging position shifts between a blue image and other images, and color shift occurs.

In contrast to this, according to the embodiment, it is possible to reduce a time difference between blue images, and to suppress an occurrence of the above described color shift by setting the number of color images which are interposed between blue images to four.

Seventh Embodiment

Hereinafter, a seventh embodiment of the invention will be described based on drawings.

In the first embodiment, a configuration in which accumulated charges of the imaging element 11 are reset at a predetermined timing, for example, a case in which a predetermined number of frames are imaged is exemplified. In contrast to this, the seventh embodiment is different from the first embodiment in a point that, when the amount of accumulated charge (voltage value) exceeds a predetermined value, the accumulated charge is reset.

Figure 12:
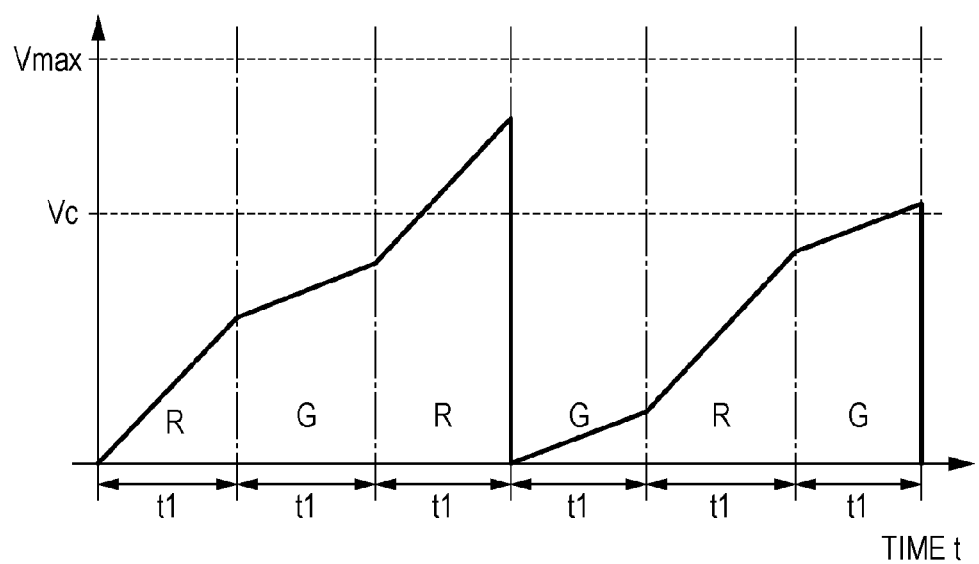
FIG. 12 is a graph which schematically illustrates an example of a voltage change corresponding to an accumulated charge of an imaging element according to a seventh embodiment.

FIG. 12 is a graph which schematically illustrates a change in one pixel, in which charge is accumulated, between a time and a voltage in the imaging element 11 which is configured so as to accumulate charges in a non-destructive manner.

According to the embodiment, a voltage value corresponding to the amount of accumulated charges is obtained using the light intensity obtaining unit 33 with respect to each pixel of the imaging element 11. When the imaging element driving unit 32 detects that the voltage value exceeds a predetermined value Vc (Yes in step S2 in FIG. 5), the imaging element driving unit causes the imaging element 11 to reset the accumulated charge (step S3 in FIG. 5).

The above described predetermined value is set so as to be less than a maximum voltage value Vmax corresponding to a received light intensity which is appropriately detected by the imaging element 11 (that is, saturation amount of imaging element).

Operational Effects of Seventh Embodiment

According to the embodiment, it is possible to prevent a problem in which the received light intensity of the imaging element 11 exceeds a saturation amount, and it is not possible to detect an accurate voltage value corresponding to a received light intensity.

In addition, it is preferable that a predetermined value be set so as to be a value in which a maximum value of a voltage value corresponding to a received light intensity of one frame is roughly estimated in advance, and the maximum value is subtracted from a maximum voltage value or more. In this manner, it is possible to suppress resetting noise, and to reduce measurement time without resetting the accumulated charge, even when an image of one frame can be obtained.

Eighth Embodiment

Hereinafter, an eighth embodiment of the invention will be described based on drawings.

In each of the above described embodiments, two or more color images including at least a red image and a green image among a red image, a green image, and a blue image are sequentially obtained in a predetermined order.

In contrast to this, according to the embodiment, an order of obtaining color images is changed, and a generation method of a composite image is changed according to a change in a measurement target X (for example, changing speed of relative position of measurement target X and spectrometry device, or the like).

Figure 13:
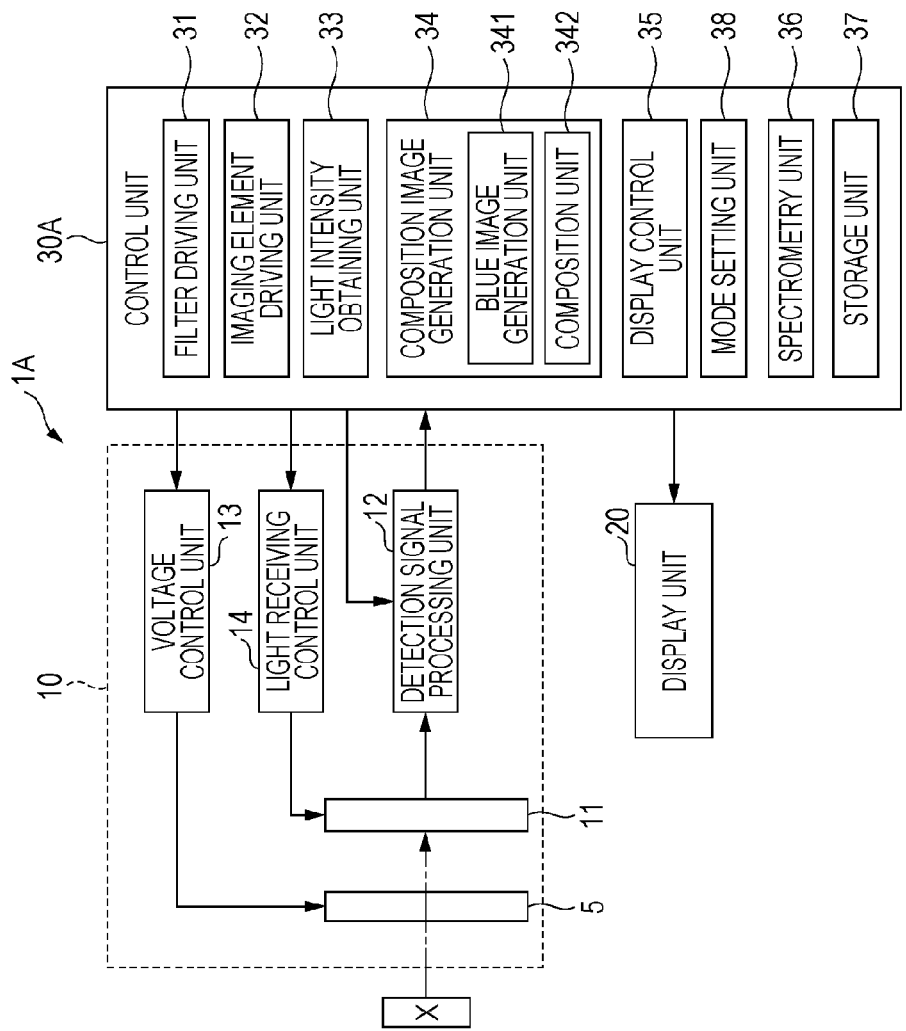
FIG. 13 is a block diagram which illustrates a schematic configuration of a spectrometry device according to an eighth embodiment of the invention.

FIG. 13 is a block diagram which illustrates an example of a schematic configuration of a spectrometry device according to the eighth embodiment.

In a spectrometry device 1A, a control unit 30A further includes a mode setting unit 38 with respect to the control unit 30 in the first embodiment.

Here, the spectrometry device 1A is configured so as to perform two generation methods of a composite image in the third and fourth embodiments. Specifically, a first mode in the fourth embodiment in which color images are sequentially obtained in order of a red image (R), a green image (G), a blue image (B), and a green image (G), and a composite image is generated, and a second mode in the third embodiment in which color images are sequentially obtained in order of a red image (R), a green image (G), and a blue image (B), and a composite image is generated are performed.

The mode setting unit 38 sets a mode for executing from two modes. Specifically, the mode setting unit 38 usually sets a first mode. In addition, the mode setting unit 38 sets a second mode when it is determined that a shift in imaging positions between each of color images exceeds an allowable value due to a rapid change in the measurement target X, or a rapid change in relative position of the measurement target X and the spectrometry device 1A. In the second mode, since a red image (R), a green image (G), and a blue image (B) are sequentially obtained, it is possible to reduce a time difference between three color images with respect to a measurement target, and to suppress a shift in measurement position between each of color images with respect to a change in measurement target.

In the mode setting unit 38, as a determining method when determining that a change in imaging target between each of color images exceeds an allowable range, for example, there is a method in which a fluctuation amount of an image between the latest color image and a color image which has the same color as the latest color image, and is obtained previously to the latest color image is quantitatively estimated, among the color images which are sequentially obtained.

More specifically, when a squared error in each pixel is calculated with respect to the two color images, a total value S of the calculated squared error is obtained, and the total value S is larger than a threshold value T, it is determined that a change in an imaging target between each of color images exceeds an allowable range. In addition, the threshold value T is set so that a composite image of which a degree of color shift is in the allowable range is obtained, according to a light receiving time of one frame, a resolution of the imaging element 11, sensitivity, or the like.

Figure 14:
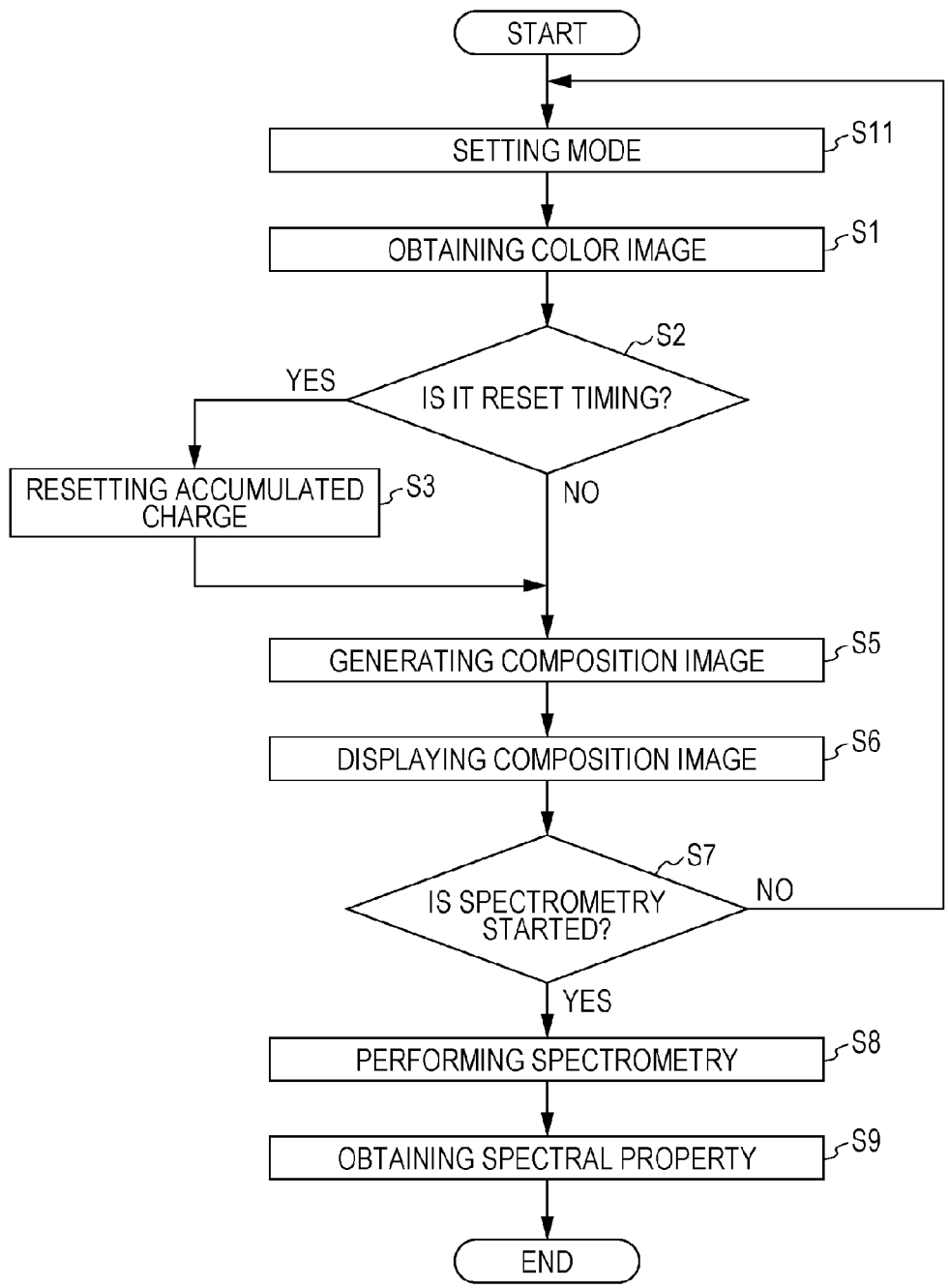
FIG. 14 is a flowchart which illustrates an example of a spectrometry process in the eighth embodiment.

FIG. 14 is a flowchart which illustrates an example of a spectrometry process using the spectrometry device 1A. In addition, steps denoting the same processes as in the spectrometry processes in the spectrometry device 1 according to the first embodiment which is illustrated in FIG. 5 will be given the same reference numerals, and descriptions thereof will be simplified.

As illustrated in FIG. 14, when the process is started, the mode setting unit 38 sets the first mode which is a usual mode (step S11).

Thereafter, the spectrometry device 1A obtains a color image in the first mode (step S1), and determines whether or not it is a timing for resetting charges which are accumulated in the imaging element 11 (step S2). When it is a resetting timing, the charges in the imaging element 11 are reset (step S3). When it is not a resetting timing, charges are consecutively accumulated without resetting charges of the imaging element 11.

Subsequently, and a composite image is generated by compositing the obtained red image, green image, and blue image (step S5), and the generated composite image is displayed on the display unit 20 as a real time image (step S6).

Subsequently, the control unit 30A determines whether or not an instruction for starting spectrometry has been received, and when the instruction for starting spectrometry has not been received (No in step S7), the real time image displaying process is performed in succession.

When receiving the instruction for starting spectrometry (Yes in step S7), the spectrometry device 1A obtains a result of spectrometry based on a light intensity which is obtained by performing the spectrometry (step S8).

Subsequently, the spectrometry unit 36 obtains spectral spectrum using the spectrometry results (step S9). Operational effects of eighth embodiment According to the embodiment, the spectrometry device 1A may determine that a change in imaging target between each of color images has exceeded an allowable range, and is capable of changing a generation mode of the composite image. That is, when the change in imaging target is in the allowable range, for example, the composite image is obtained using the first mode which is capable of improving color reproduction. Meanwhile, when the change in imaging target exceeds the allowable range, the composite image is obtained using the second mode which is capable of suppressing color shift. In such a configuration, it is possible to obtain a composite image in a mode corresponding to an amount of change of an imaging target, and to display a real time image of which reproductivity is high.

Modification Example of Eighth Embodiment

As the first mode which is capable of improving color reproduction, the generation method of a composite image according to the fourth embodiment has been exemplified; however, it is not limited to this, and for example, the generation method according to the fifth embodiment or the sixth embodiment may be adopted.

In addition, similarly, as the second mode which is capable of suppressing a color shift, the generation method of a composite image according to the third embodiment has been exemplified; however, it is not limited to this, and for example, the generation method of a composite image according to the first embodiment or the second embodiment may be adopted.

In addition, in the mode setting unit 38, the determining method when determining that a change in imaging target between each of color images exceeds an allowable range is not limited to the above described method, and for example, a mean value of light intensity (or voltage value) of each pixel of a green image of which a level of contribution with respect to luminance is high may be obtained, and when a shift amount Y of the mean value between the latest green image and a green image which is previously obtained exceeds a threshold value $T_Y$, a determination may be made that a change in imaging target exceeds the allowable range.

In addition, there is no limitation to a configuration in which a mean value of a whole green image is obtained, and comparison being between consecutive green images. For example, a maximum value in a case in which a green image is divided into a plurality of image regions, a mean value is calculated in each image region, and a shift amount of the mean value in each image region to which consecutive green images correspond is calculated may be set to $Y_M$. When the maximum value $Y_M$ of the shift amount in each image region exceed a threshold value $T_{YM}$ ($Y_M > T_{YM}$), a determination may be made that the change in the imaging target exceeds the allowable range.

In addition, a histogram may be created based on a received light intensity (voltage value) of each pixel in each color image of the latest color image, and each color image which has the same color as the latest color image, and was obtained previously to the latest image. In addition, a value of squared error $X_H$ between each of color images is obtained in each level (range of received light intensity) of the histogram, and when the value of squared error $X_H$ exceeds the threshold value $T_X$ ($X_H > T_X$), a determination may be made that the change in imaging target exceeds the allowable range.

Modification of Embodiment

In addition, the invention is not limited to each of the above-described embodiments, and configurations which are obtained by performing a modification, an improvement, an appropriate combination of each of embodiments, and the like, in a range of achieving the object of the invention are included in the invention.

For example, in each of the above-described embodiments, the spectrometry devices 1 and 1A are exemplified; however, it is possible to apply the invention to an analysis device which performs a component analysis, or the like, of a measurement target.

In addition, in each of the above-described embodiments, a configuration of obtaining spectral spectrum based on a measurement result has been exemplified as the spectrometry devices 1 and 1A; however, the invention is not limited to this, and it is possible to apply the invention to various electronic devices such as a spectral camera which obtains a spectral image. That is, it is possible to improve a frame rate of a real time image when generating a composite image, and displaying the composite image as a real time image, for example, a case in which a measurement value is set while referring to a real time image. For this reason, it is possible to display a real time image of which reproductivity is high with respect to the measurement target X, and with a high follow-up performance with respect to a movement of the measurement target X.

In each of the above-described embodiments, a configuration in which an imaging element is configured so as to perform reading in a non-destructive manner has been exemplified; however, the invention is not limited to this, and an imaging element in which accumulated charge is reset every time a detection signal is read may be used. In this case, a plurality of exposure amounts is obtained with respect to each wavelength, by measuring each wavelength using a plurality of exposure times.

In each of the above-described embodiments, there may be a configuration in which the wavelength variable interference filter 5 is incorporated in the optical module 10 in a state of being accommodated in a package. In this case, it is possible to improve driving responsiveness when a voltage is applied to the electrostatic actuator 56 of the wavelength variable interference filter 5 by performing vacuum sealing of the package in the inside thereof.

In each of the above-described embodiments, the wavelength variable interference filter 5 is configured by including the electrostatic actuator 56 which causes a fluctuation in gap size between reflecting films 54 and 55 by applying a voltage; however, the invention is not limited to this.

For example, it may be a configuration in which a dielectric actuator in which a first dielectric coil is arranged instead of the fixed electrode 561, and a second dielectric coil or a permanent magnetic is arranged instead of the movable electrode 562 are used.

In addition, it may be a configuration in which a piezoelectric actuator is used instead of the electrostatic actuator 56. In this case, it is possible to bend the holding unit 522 by causing a piezoelectric film to expand or contract, by arranging, for example, a lower electrode layer, the piezoelectric film, and an upper electrode layer in a stacking manner in the holding unit 522, and by varying a voltage which is applied between the lower electrode layer and the upper electrode layer, as an input value.

In each of the above-described embodiments, the wavelength variable interference filter 5 in which the fixed board 51 and the movable board 52 are bonded in a state of facing each other as a Fabry-Perot etalon, the fixed reflecting film 54 is provided on the fixed board 51, and the movable reflecting film 55 is provided on the movable board 52 is exemplified; however, the invention is not limited to this.

For example, it may be a configuration in which the fixed board 51 and the movable board 52 are not bonded, and a gap changing unit which changes a gap between reflecting films such as a piezoelectric element, or the like, is provided between the boards, or the like.

In addition, it is not limited to a configuration which is configured of two boards. For example, a wavelength variable interference filter in which two reflecting films are stacked on one board through a sacrificial layer, and a gap is formed by eliminating the sacrificial layer using etching, or the like, may be used.

In addition, as the spectral filter, for example, an Acousto Optic Tunable Filter (AOTF), or a Liquid Crystal Tunable Filter (LCTF) may be used. However, it is preferable to use the Fabry-Perot filter as in each of the above-described embodiments, when considering miniaturization of the apparatus.

Other than that, a specific structure when executing the invention may be a configuration in which each of the above-described embodiments and modification examples are appropriately combined in a range in which objects of the invention are achieved, and may be appropriately changed into other structures, or the like.

The entire disclosure of Japanese Patent Application No. 2014-014088 filed on Jan. 29, 2014 is expressly incorporated by reference herein.

What is claimed is:

1. An electronic apparatus comprising:
   a spectral filter which selectively outputs light with a wavelength among input light, and is capable of changing the wavelength of the output light;
   a filter driving unit which sets the wavelength of the output light, and makes sequentially output at least red light and green light among three color light beams of the red light in a red color wavelength range, the green light in a green color wavelength range, and blue light in a blue color wavelength range in a predetermined order from the spectral filter;
   an imaging element which receives at least the red light and the green light which are sequentially output from the spectral filter, and obtains at least a red image and a green image among three color images of the red image, the green image, and a blue image corresponding to the three color light beams; and
   an image generation unit which generates a composite image using the latest color images including at least the red image and the green image which are obtained using the imaging element.

2. The electronic apparatus according to claim 1,
   wherein the filter driving unit sequentially outputs the red light and green light from the spectral filter,
   wherein the imaging element sequentially obtains the red image and the green image which respectively correspond to the red light and the green light, and
   wherein the image generation unit includes a blue image generation unit which generates the blue image from the red image and the green image, and a composition unit which composites the latest red image and green image, and the blue image which is generated by the blue image generation unit, and generates the composite image.

3. The electronic apparatus according to claim 2,
   wherein the blue image generation unit generates the blue image from a set of red image and green image every time the set of red image and green image corresponding to a set of the red light and the green light which is consecutively output is obtained, and
   wherein the composition unit generates the composite image every time the set of red image and green image is obtained.

4. The electronic apparatus according to claim 2,
   wherein the blue image generation unit generates the blue image from the latest red image and green image every time any of the red image and green image corresponding to the red light and the green light, respectively, is obtained, and
   wherein the composition unit generates the composite image every time any of the red image and green image is obtained.

5. The electronic apparatus according to claim 1,
   wherein the filter driving unit sequentially outputs the three color light beams in a predetermined order from the spectral filter,
   wherein the imaging element sequentially obtains the red image, the green image, and the blue image which correspond to the red light, the green light, and the blue light in a predetermined order, and wherein the image generation unit generates the composite image in which the latest red image, green image, and blue image are composited every time any of the three color images is obtained.

6. The electronic apparatus according to claim 5, wherein the filter driving unit outputs each color light in order of the red light, the green light, the blue light, and the green light.

7. The electronic apparatus according to claim 5, wherein the filter driving unit sets a frequency of outputting the blue light among the color light beams to be lower than frequencies of outputting the red light and the green light.

8. The electronic apparatus according to claim 7, wherein the filter driving unit outputs the red light and the green light at intervals of two frames, two frames, and one frame, respectively, and the blue light with an interval of three frames.

9. The electronic apparatus according to claim 1, wherein the imaging element performs reading of charges which are accumulated according to a received light intensity of light which is output from the spectral filter using a non-destructive readout method which is not accompanied by resetting of the accumulated charges, and wherein the imaging element includes an imaging element driving unit which causes the imaging element to reset the accumulated charge every time a predetermined number of the color images are obtained.

10. The electronic apparatus according to claim 1, wherein the imaging element performs reading of the charges which are accumulated according to the received light intensity of the light which is output from the spectral filter using the non-destructive readout method which does not accompany resetting of the accumulated charge, and wherein the imaging element includes the imaging element driving unit which causes the imaging element to reset the accumulated charge when exceeding a predetermined received light intensity.

11. A method of controlling an electronic apparatus which includes a spectral filter which selectively outputs light with a predetermined wavelength from input light, and is capable of changing a wavelength of the output light, a filter driving unit which sets a wavelength of light which is output from the spectral filter, an imaging element which receives color light beams output from the spectral filter, and obtains color images, and an image generation unit which generates a composite image using the color images which are obtained using the imaging element, the method comprising:

sequentially outputting at least red light and green light among three color light beams of predetermined red light in a red color wavelength range, predetermined green light in a green light wavelength range, and predetermined blue light in a blue light wavelength range from the spectral filter in a predetermined order;

obtaining at least the red image and green image among three color images of the red image, the green image, and a blue image corresponding to the three color light beams by receiving at least the red light and green light; and generating a composite imagecomposite image using latest color images including at least the red image and green image which are obtained.

12. An electronic apparatus comprising:

a spectral filter that outputs output light among input light, and that is capable of changing wavelength of the output light;

a filter driving unit that drives the spectral filter to set the wavelength;

an imaging element that receives the output light; and an image generation unit that generates a composite image that is obtained by the imaging element, wherein the spectral filter outputs at least red light and green light in a predetermined order, the composite image including latest color images that includes a red image corresponding to the red light, and a green image corresponding to the green light, and the image generation unit that generates the composite image is configured to generate a blue image from the red image and the green image.

* * * * *